(12) United States Patent
Arahira

(10) Patent No.: US 7,646,985 B2
(45) Date of Patent: Jan. 12, 2010

(54) OPTICAL CLOCK SIGNAL EXTRACTION DEVICE AND OPTICAL CLOCK SIGNAL EXTRACTION METHOD

(75) Inventor: Shin Arahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 507 days.

(21) Appl. No.: 11/704,968

(22) Filed: Feb. 12, 2007

(65) Prior Publication Data
US 2007/0189777 A1 Aug. 16, 2007

(30) Foreign Application Priority Data
Feb. 14, 2006 (JP) ............... 2006-036128

(51) Int. Cl.
*H04B 10/00* (2006.01)
(52) U.S. Cl. ...................... 398/155; 398/175
(58) Field of Classification Search ............. 398/155, 398/175, 176
See application file for complete search history.

(56) References Cited

U.S. PATENT DOCUMENTS

| | | | | |
|---|---|---|---|---|
| 5,911,015 A * | 6/1999 | Bigo | ............ | 385/1 |
| 6,636,318 B2 * | 10/2003 | Sarathy et al. | ............ | 356/477 |
| 6,813,447 B2 * | 11/2004 | Ellis et al. | ............ | 398/155 |
| 6,963,436 B2 * | 11/2005 | Watanabe et al. | ............ | 359/239 |
| 7,561,811 B1 * | 7/2009 | Watanabe | ............ | 398/201 |
| 2001/0053008 A1 * | 12/2001 | Ueno | ............ | 359/158 |

(Continued)

OTHER PUBLICATIONS

"Optical clock extraction from 1-Gbit/s data pluses by monolithic mode-locked laser diodes", T. Ono, et al., OFC '95, Technical Digest, ThL4, 1995.

(Continued)

*Primary Examiner*—Nathan M Curs
(74) *Attorney, Agent, or Firm*—Venable LLP; James R. Burdett

(57) ABSTRACT

The present invention is an optical clock signal extraction device, comprising first conversion means and second conversion means for enabling to extract an optical clock signal without depending on the polarization direction of an input optical signal. The first conversion means comprises a first optical converter and a continuous wave light source of which wavelength is $\lambda_2$, where an input optical signal of which wavelength is $\lambda_1$ and continuous wave light of which wavelength is $\lambda_2$ are input to the first optical converter, and an intermediate optical signal of which wavelength is $\lambda_2$ is generated and output without depending on the polarization direction of the input optical signal. The second conversion means has a second optical converter, where the intermediate optical signal is input to the second optical converter, and an optical clock signal of which wavelength is $\lambda_3$ is generated and output by the passive mode locking operation of the second optical converter. The input optical signal is input from the end face L1 of the first optical converter, and the continuous wave light of which wavelength is $\lambda_2$ is input to the first optical converter from the other end face of the first optical converter. The intermediate optical signal is output from the end face of the first optical converter and input to the end face of the second optical converter. The optical clock signal is output from the other end face of the second optical converter.

20 Claims, 10 Drawing Sheets

U.S. PATENT DOCUMENTS 5,999,287 A * 12/1999 Davies et al. .................. 398/98
6,028,687 A *  2/2000 Cremer ....................... 398/155

OTHER PUBLICATIONS

"All-optical timing extraction using a 1.5 µm self pulsating multi-electrode DFB LD", M. Jinno et al., Electron. Lett., vol. 23, No. 23, pp. 1426-1427, Sep. 1988.

"All-optical 160 Gb/s clock extraction with a mode-locked laser diode module", S. Arahira, et al., IEEE Photon. Technol. Lett. vol. 16, No. 6, pp. 1558-1560, Jun. 2004.

"Enhanced recovery rates in semiconductor laser amplifiers using optical pumping", R.J. Manning, et al., Electron. Lett. vol. 30, No. 10. pp. 787-788, May 1994.

* cited by examiner

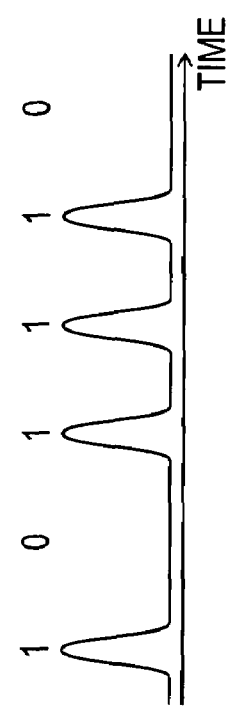
FIG.7A1
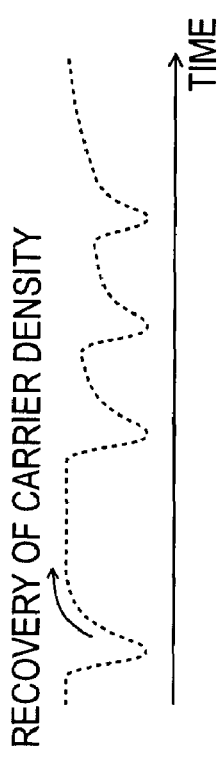
FIG.7A2
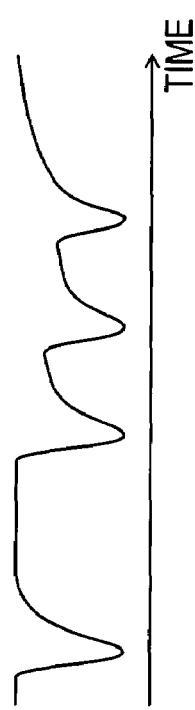
FIG.7A3
FIG.7B1
FIG.7B2 RECOVERY OF CARRIER DENSITY
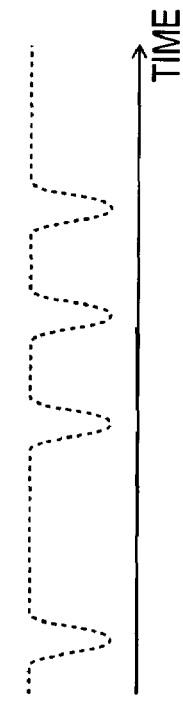
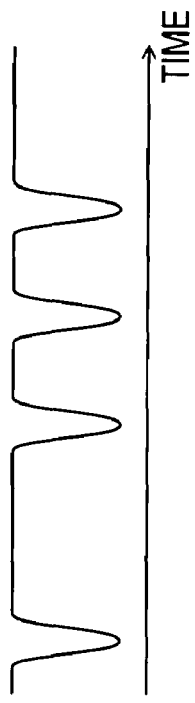
FIG.7B3

TIME  6.3ps/div.

TIME  6.3ps/div.

OPTICAL CLOCK SIGNAL EXTRACTION DEVICE AND OPTICAL CLOCK SIGNAL EXTRACTION METHOD

BACKGROUND OF THE INVENTION

1. Field of the Invention

The present invention relates to an optical clock signal extraction device to be used for an optical repeater of a long distance large capacity optical fiber communication system, and more particularly to a device for extracting high-speed optical clock signals which exceed the upper limit operation speed of an electronic device.

2. Description of Related Art

In an optical communication network, the transmission distance is constantly becoming longer with larger capacities. With the distance of transmission becoming longer, deterioration of the quality of optical signals becomes a problem, due to the optical loss in optical transmission lines, a drop in the S/N ratio by the user of optical amplifiers in multiple steps, and waveform distortion by group velocity dispersion, non-linear optical effect, and their combined effect in optical fibers. The generation of waveform distortion in the frequency domain and the waveform distortion in the time domain become more conspicuous problems as transmission capacity increases.

Because of this, repeaters are installed in the middle of an optical transmission line with an interval of several tens to several hundred kilometers, and optical signals are regenerated, that is, the waveforms in the frequency domain and the waveforms in the time domain of the optical signals are restored to the original forms by the repeater. One major role of the repeater is clock signal extraction. Clock signal extraction is generating a pulse output (or sine wave output) signal corresponding to the bit rate from the optical signal formed by the optical pulses in which the waveform in the time domain is distorted, that is an optical signals of which quality deteriorated.

A clock signal is extracted either as an electric signal or an optical signal, depending on the case, and in the following description, a clock signal may be referred to as an electric clock signal and optical clock signal only when necessary to clarify which form the clock signal is extracted. Frequency corresponding to the bit rate of the optical signal indicates the frequency f when the bit rate of the optical signal is f. For example, if the bit rate of the optical signal is fGbits/s, the frequency corresponding to the bit rate of the optical signals is assumed to be fGHz. Hereafter the frequency corresponding to the bit rate of the optical signal may be called the "bit rate frequency". In this example, the bit rate is denoted in Gbit/s and frequency is denoted in GHz, but in the following description, the unit is not limited to this. Therefore in the following description, unless necessary, the unit notation may be omitted.

One general method conventionally known as a clock signal extraction method is a method of extracting only the frequency components corresponding to the bit rate of an input optical signal by inputting an optical signal, of which quality deteriorated, into a photodiode performing photoelectric conversion and filtering the output electric signal from the photodiode by a band pass filter. Hereafter an optical signal, to be the target of extracting the clock signals including optical signals of which quality deteriorated is called an input optical signal.

An optical pulse string is generated by generating an electric clock signal using a photodiode and band pass filter, and operating an optical pulse laser device, such as a laser diode using the electric clock signal. This optical pulse string is a string of optical pulses lined up on a time axis at a cycle of repeat frequency which corresponds to the bit rate frequency of the input optical signal. In the following description, an optical signal refers to an optical signal generated as an RZ (Return to Zero) signal, which is a binary digital signal. This optical signal is a signal generated by performing optical modulation on a string of optical pulses which regularly line up at a predetermined periodic interval on a time axis. The expression "optical pulse string" is assumed to be all the optical pulses which regularly line up at a predetermined periodic interval on a time axis.

Generally the photoelectric conversion characteristic of a photodiode does not depend so much on polarization thereof, so even if a time-based fluctuation exists on the plane of polarization of the input optical signal, a clock signal can be stably extracted by using a photodiode.

On the other hand, as a technology to increase the transmission capacity of an optical communication network, a multiplexing transmission technology, such as optical time division multiplexing, is under research. A bit rate of the multiplexed signal is a bit rate per multiplexed channel, multiplied by the number of channels, so it is a very high bit rate. Hereafter the bit rate of a multiplexed signal may be referred to as the "transmission rate", and the bit rate per channel as the "base rate".

If the bit rate of the multiplexed signal exceeds 40 Gbit/s, it is difficult to extract a clock signal in the electronic device. This is because a photodiode which operates even at 40 Gbit/s or higher bit rate optical signals and an electric narrow band filter which operates even at 40 GHz or higher electric signals have not been developed.

In order to extract a clock signal from a high-speed optical signal, a method of extracting the optical clock signal directly without performing photoelectric conversion is used. Hereafter this method of extracting optical clock signals directly without performing photoelectric conversion may be called the "all-optical clock signal extraction method".

As the all optical clock signal extraction method, a method of using a mode-locked laser has been reported (e.g. see T. Ono, T. Shimizu, Y. Yano and H. Yokoyama: "Optical clock extraction from 10-Gbit/s data pluses by using monolithic mode-locked laser diodes" OFC '95, Technical Digest, ThL4). Also a method of using a self-excited pulse generation laser, such as a self pulsation laser, has been reported (e.g. see M. Jinno and T. Matsumoto: "All-optical timing extraction using a 1.5 μm self pulsating multi-electrode DFB LD", Electron. Lett., Vol. 24, No. 23, pp. 1426-1427, September 1988).

In any of these methods, the input optical signal is input to the mode-locked laser or self pulsation laser which generation optical pulses at a repeat frequency close to the bit rate of the input optical signal, and extracts optical clock signals by synchronizing the output optical pulses from the mode-locked laser of self pulsation laser with the bit rate of the input optical signal.

One advantage of these methods is that a high-speed clock signal can be extracted as an optical clock signal, which is impossible with an electronic device, as mentioned above. For example, a reported example is that the extraction of an optical clock signal from 160 Gbit/s optical signal succeeded (e.g. see S. Arahira, S. Sasaki, K. Tachibana and Y. Ogawa: "All-optical 160 Gb/s clock extraction with a mode-locked laser diode module", IEEE Photon. Technol. Lett. Vol. 16, No. 6, pp. 1558-1560, June 2004).

However the above mentioned conventional all-optical clock signal extraction method has the following problem. That is, the operation for optical clock signal extraction depends on the polarization direction of the input optical signal. In order to extract the optical clock signal by a mode-locked laser and self pulsation laser, the polarization direction of the input optical signal and polarization direction of the oscillation light of the laser must be matched.

Therefore if the polarization direction of the input optical signal changes for any reason, the optical clock signal cannot be extracted stably. Generally, the input optical signal propagates through a single mode optical fiber where maintaining the polarization direction is not guaranteed, and is input to an optical repeater, for example. Therefore a method which can extract an optical clock signal stably even if the polarization direction changes must be considered based on the assumption that the polarization direction of an input optical signal to be input to the optical repeater changes along with time.

With the foregoing in view, it is an object of the present invention to provide an optical clock signal extraction device which can extract an optical clock signal without depending on the polarization direction of the input optical signal.

SUMMARY OF THE INVENTION

To achieve the above object, an optical clock signal extraction device of the first invention comprises first conversion means and second conversion means. The first conversion means further comprises a first optical converter and a continuous wave light source of which wavelength is $\lambda_2$. Into the first optical converter, an input optical signal of which bit rate is f (e.g. fGbit/s) and wavelength is $\lambda_1$, and the continuous wave light of which wavelength is $\lambda_2$ are input. And the first optical converter generates and outputs an intermediate optical signal which has wavelength $\lambda_2$ and which does not depend on the polarization direction of the input optical signal. The second conversion means further comprises a second optical converter, and the intermediate optical signal is input to the second optical converter, and an optical clock signal, of which repeat frequency is f (e.g. fGHz) and wavelength is $\lambda_3$ are generated by the passive mode-locking operation of the second optical converter, and are output from the second conversion means.

The optical clock signal extraction device of the second invention has a different first conversion means from the optical clock signal extraction device of the above mentioned first invention. The first conversion means in the optical clock signal extraction device in the second invention comprises a first optical converter, a continuous wave light source of which wavelength is $\lambda_2$, and a continuous wave light source of which wavelength is $\lambda_4$. Into the first optical converter, an input optical signal of which bit rate is f and wavelength is $\lambda_1$, continuous wave light of which wavelength is $\lambda_2$, and continuous wave light of which wavelength is $\lambda_4$, are input, and an intermediate optical signal of which wavelength is $\lambda_2$ is generated and output from the first optical converter without depending on the polarization direction of the input optical signals.

In the optical clock signal extraction devices according to the first and second inventions, it is preferable that the first optical converter is a semiconductor optical amplifier (SOA), where an active layer is formed by bulk crystals, non-reflective coating is performed on an input end and an output end, and an amplification factor does not depend on the polarization direction of the input optical signal.

In the optical clock signal extraction devices according to the first and second inventions, it is preferable that the first optical converter is an SOA where an active layer is formed by a strained-layer quantum-well structure, and a non-reflective coating is performed on an input end and output end, and an amplification factor does not depend on the polarization direction of the input optical signal.

Also in the optical clock signal extraction device according to the first invention, it is preferable that the first optical converter is a saturable absorber, where an active layer is formed by a strained-layer quantum-well structure, a non-reflective coating is performed on an input end and an output end, and an amplification factor does not depend on the polarization direction of the input optical signal.

Also in the optical clock signal extraction device according to the first invention, it is preferable that the first optical converter is an electro-absorption modulator (EAM), where an active layer is formed by a strained-layer quantum-well structure, a non-reflective coating is performed on an input end and an output end, and an application factor does not depend on the polarization direction of the input optical signal.

In the optical clock signal extraction device according to the first and second inventions, it is preferable that the second optical converter is a passive mode-locked laser diode having a gain area and a saturable absorption area.

According to the first clock signal extraction device of the above described first invention, the first conversion step and the second conversion step, to be described below, can be implemented. The first conversion step is a step of inputting an input optical signal of which bit rate is f and wavelength is $\lambda_1$, and a continuous wave light of which wavelength is $\lambda_2$, into a first optical converter, and generating and outputting an intermediate signal, of which wavelength is $\lambda_2$, by the cross gain modulation (XGM) effect, which is manifested by the input optical signal and the continuous wave light of which wavelength is $\lambda_2$, without depending on the polarization direction of the input optical signal. The second conversion step is a step of inputting the intermediate optical signal into a second optical converter, and generating and outputting an optical clock signal of which repeat frequency is f and wavelength is $\lambda_3$ by the passive mode-locking operation of the second optical converter.

According to the optical clock signal extraction device of the above described second invention, the first conversion step to be described below can be implemented. The first conversion step is a step of inputting an input optical signal of which bit rate is f and wavelength is $\lambda_1$, a continuous wave light of which wavelength is $\lambda_2$, and a continuous wave light of which wavelength is $\lambda_4$ into a first optical converter, and generating and outputting an intermediate signal, of which wavelength is $\lambda_2$, by the XGM effect, which is manifested by the input optical signal of which wavelength is $\lambda_1$, a continuous wave light of which wavelength is $\lambda_2$, and a continuous wave light of which wavelength is $\lambda_4$, without depending on the polarization direction of the input optical signal. The second conversion step is the same as the second conversion step, which is implemented by the optical clock signal extraction device of the first invention.

If the passive mode-locked laser diode having a gain area and saturable absorption area is used as the second optical converter, one of the longitudinal oscillation modes of the passive mode-locked laser diode is set to a value close to $\lambda_2$, which is a wavelength of the intermediate signal to execute the second conversion step.

When the input optical signal of which bit rate is f and wavelength is $\lambda_1$, and the continuous wave light of which wavelength is $\lambda_2$ are input to the first optical converter, the intermediate optical signal of which repeat frequency is f and wavelength is $\lambda_2$ is generated by the XGM effect (first conversion step). Although this will be described later in detail, the XGM effect is a phenomena where when optical pulses constituting the input optical signal are input to the first optical modulator, the gain of the first optical modulator decreases because of the optical pulses, so the gain of the first optical converter is modulated, reflecting the positional relationship of the optical pulses constituting the input optical signal on the time axis. This phenomena is generated because the gain of the first optical converter decreases if optical pulses exist, and the gain is recovered if optical pulses do not exist.

In other words, if the optical pulse signal, that is an input optical signal of which wavelength is $\lambda_1$, and an continuous wave light of which wavelength is $\lambda_2$, are input to the first optical converter so as to coexist in the first optical converter, the gain of the first optical converter is modulated by the optical pulse signal, that is input optical signal. In this way, the intensity of the continuous wave light of which wavelength $\lambda_2$ is modulated by the gain of the first optical converter being modulated. Therefore the input optical signal and the intermediate optical signal of which wavelength is $\lambda_2$, generated as a result of modulation of the continuous wave light of which wavelength is $\lambda_2$, are logically inverted. In other words, the optical pulses of the intermediate optical signal do not exist in the time zone when the optical pulses constituting the input optical signal exist, and the optical pulses of the intermediate optical signal exist in the time zone when the optical pulses constituting the input optical signal do not exist.

The first optical converter generates and outputs the intermediate optical signal of which wavelength is $\lambda_2$ by the XGM effect without depending on the polarization direction of the input optical signal, so even if the polarization direction of the input optical signal is changed during propagation by a time-based change, such as the state of the transmission line, the intermediate optical signal is stably generated.

When the intermediate optical signal is input to the second optical converter, an optical clock signal of which repeat frequency is f and wavelength is $\lambda_3$ is generated by the passive mode-locking operation (second conversion step). Since the first optical converter and the second optical converter can be housed in a same body, it is easy to input the intermediate optical signal which is output from the first optical converter to the second optical converter, with maintaining the polarization direction. For example, the first optical converter and the second optical converter can be implemented by using an optical component for propagating the signals while maintaining the polarization direction of the polarization plane preserving optical fiber.

Therefore according to the optical clock signal extraction device of the first invention, the intermediate optical signal is generated without depending on the polarization direction of the input optical signal, and the intermediate generation optical signals are input to the second optical converter without maintaining the polarization direction thereof, so the passive mode-locking operation can be implemented stably in the second optical converter, and the optical clock signal is extracted by the second optical converter without depending on the polarization direction of the input optical signal.

In the optical clock signal extraction device according to the first and second inventions, the first optical converter is an SOA, where an active layer is formed by bulk crystals and a non-reflective coating is performed on an input end and an output end, so the amplification factor does not depend on the polarization direction of the input optical signals. This is because in the III-V group semiconductor bulk crystals used for the SOA, such as InP, GaAs or mixed crystals thereof, the gain does not depend on the polarization direction. In other words, it is possible to make the gain in an optical wave guide of the SOA not depend on the polarization direction by using the optical wave guide as the gain area.

In the optical clock signal extraction device according to the first and second inventions, the first optical converter is an SOA where an active layer is formed by a strained-layer quantum-well structure and a non-reflective coating is performed on an input end and an output end, so the amplification factor does not depend on the polarization direction of the input optical signal. This is because it is possible to make the gain in the optical wave guide, formed by a strained-layer quantum-well structure in which a strain-layer is used, not depend on the polarization direction by using the optical wave guide as the gain area.

According to the optical clock signal extraction device of the second invention, the continuous wave light of which wavelength is $\lambda_4$ is also input to the first optical converter in addition to the continuous wave light of which wavelength is $\lambda_2$ in the first conversion step. By using an SOA as the first optical converter and supplying the continuous wave light of which wavelength is $\lambda_4$ to the SOA in addition to the continuous wave light of which wavelength is $\lambda_2$, the following effect is implemented, although this will be described in detail later. In the active area of the SOA, induced emission is enhanced by the supply of the continuous wave light of which wavelength is $\lambda_4$. Because of this, the recovery speed of the carrier density can be increased. As a result, an intermediate optical signal can be generated from the input optical signal of which bit rate is higher (first conversion step), and as a result, optical clock signal can be extracted from input optical signal of which bit rate is higher.

In the optical clock signal extraction device according to the first invention, the first optical converter is a saturable absorber where an active layer is formed by a strained-layer quantum-well structure, and a non-reflective coating is performed on an input end and an output end, and the amplification factor does not depend on the polarization direction of the input optical signal, so the intermediate optical signal can be generated by the cross absorption modulation (XAM) effect.

Also in the optical clock signal extraction device according to the first invention, the first optical converter is an EAM, where an active layer is formed by a strained-layer quantum-well structure, a non-reflective coating is formed on an input end and an output end, and the amplification factor does not depend on the polarization direction of the input optical signal, so the intermediate optical signal can be generated by the XAM effect, just like the above mentioned case of the saturable absorber.

The XAM effect is the effect of the continuous wave light being modulated by the input optical signal using negative optical gain (that is, optical absorption). The XAM effect and the above mentioned XGM effect have different physical mechanisms, but are the same in that the continuous wave light is modulated by the input optical signal. In other words, both the XAM effect and the XGM effect can be used as a means of modulating the continuous wave light by the input optical signal. Although this will be described in detail later, operation can be faster if the first conversion step is implemented by the XAM effect.

If one of the longitudinal oscillation modes of the passive mode-locked laser diode is set to a value close to $\lambda_2$, which is a wavelength of the intermediate signal using the passive mode-locked laser diode having a gain area and a saturable absorption area as the second optical converter, and the second conversion step is executed, time jitter can be decreased, and highly sensitive extraction of optical signals can be possible. In other words, even if the intermediate optical signal is weak, such as a case when the intensity of the input optical signal is weak, or when the gain of the SOA is small, or when the intensity of continuous wave light of which wavelength is $\lambda_2$ is weak, optical clock signals can be extracted efficiently.

BRIEF DESCRIPTION OF THE DRAWINGS

The foregoing and other objects, features and advantages of the present invention will be better understood from the following description taken in connection with the accompanying drawings, in which:

FIG. 7 are diagrams depicting the pattern effect;

DESCRIPTION OF THE PREFERRED EMBODIMENTS

Figure 1:
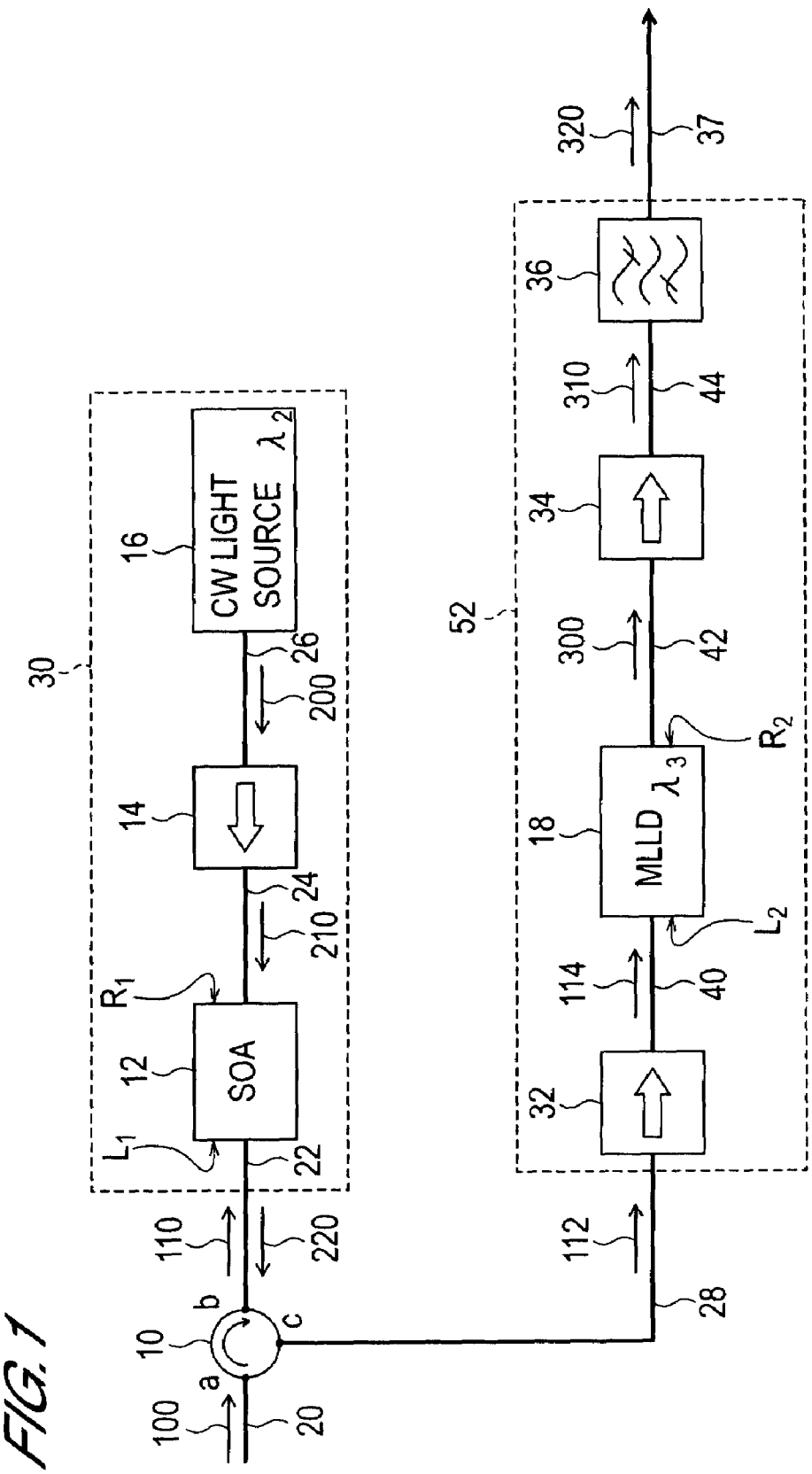
FIG. 1 is a block diagram depicting an overview of the optical clock signal extraction device according to the first embodiment.

Embodiments of the present invention will now be described with reference to the drawings. Each drawing, however, is for illustrating one configuration example of the present invention, and the positional relationship of each component element is shown roughly merely to assist in understanding the present invention, and therefore shall not limit the present invention to the illustrated examples. Also in the following description, specific materials and conditions may be used, but these materials and conditions are only examples, and the present invention shall never be limited by them. For the same composing elements in each diagram, redundant description may be omitted. In the following drawings, an optical path, such as an optical fiber, is indicated by a bold line, and a path where electric signals are transmitted is indicated by a fine line. A number assigned to each bold line and fine line indicates the path itself, but may indicate an optical pulse signal or electric signal which propagates this path in some cases, within a scope that does not cause confusion.

First Embodiment

Now the first embodiment to implement the optical clock signal extraction device according to the first invention will be described with reference to FIG. 1. The optical clock signal extraction device of the first invention comprises first conversion means 30 and second conversion means 52. The first conversion means 30 has a first optical converter 12 and a continuous wave light source 16 of which wavelength is $\lambda_2$. The input optical signal 100 of which bit rate is f and wavelength is $\lambda_1$, and a continuous wave light 200 of which wavelength is $\lambda_2$ are input to the first optical converter 12. The first optical converter 12 generates intermediate optical signal 220, of which wavelength is $\lambda_2$ without depending on the polarization direction of the input optical signal, by the XGM effect which is manifested by the input optical signal 100 and the continuous wave light 200 of which wavelength is $\lambda_2$.

The second conversion means 52 has a second optical converter 18. The intermediate optical signal 112 is input to the second optical converter 18, and an optical clock signal 320, of which repeat frequency is f and wavelength is $\lambda_3$, is generated by the passive mode-locking operation of the second optical converter 18, and are output from the second optical converter 18.

The input optical signal 100 propagates through an optical path 20 and is input from a port a of an optical circulator 10, and is output from port b, then propagates through an optical path 22 as an input optical signal 110 and is input to an end face L1 of the first optical converter 12 of the first conversion means 30. Between the first optical converter 12 and the continuous wave light source 16 of the wavelength $\lambda_2$, an optical isolator 14, for blocking the return light to the continuous wave light source 16, is installed. The continuous wave light 200, of which wavelength is $\lambda_2$, which is output from the continuous wave light source 16, propagates through an optical path 26 and propagates through an optical path 24 as a continuous wave light 210 via an optical isolator 14, and is input to the first optical converter 12 from the end face R1 of the first optical converter 12.

In this case, an SOA, of which active layer is formed by bulk crystals or a strained-layer quantum-well, is used for the first optical converter 12. For this SOA, on both end faces (end face R1 and end face L1) to which light is input and output, non-reflective coating processing is performed with $SiN_xO_y$ (x and y are parameters which indicate the composition ratio).

The intermediate optical signal 220 of which wavelength is $\lambda_2$, generated in the first optical converter 12, is output from the end face L1 of the first optical converter 12, propagates through the optical path 22, and is input to port b of the optical circulator 10, and is output from port c as an intermediate optical signal 112. The intermediate optical signal 112, which is output from port c, propagates through the optical path 28 and is input to the second conversion means 52.

The second conversion means 52 comprises a second optical converter 18, an optical band pass filter 36, an optical isolator 32 for blocking the return light from the second optical converter 18, and an optical isolator 34 for blocking the return light from the optical band pass filter 36. The optical isolators 32 and 34 are not always required, but by blocking the return lights from the second optical converter 18 or optical band pass filter 36, stable operation of the first optical converter 12 or the second optical converter 18 is guaranteed.

The intermediate optical signal 112 propagates the optical path 28, passes through the optical isolator 32, propagates through the optical path 40 as an intermediate optical signal 114, and is input to the second optical converter 18 from the end face $L_2$. Here a passive mode-locked laser diode which has a gain area and saturable absorption area is used as the second optical converter 18.

From the second optical converter 18, an optical clock signal 300 of which wavelength is $\lambda_3$ is output from the end face R2. The optical clock signal 300 propagates through the optical path 42, passes through the optical isolator 34, propagates through the optical path 44 as an optical clock signal 310, and is input to the optical band pass filter 36. The optical band pass filter 36, of which transmission wavelength is $\lambda_3$, is installed particularly for blocking light components of which wavelengths are $\lambda_1$ and $\lambda_2$. From the optical band pass filter 36, an optical clock signal 320 of which wavelength is $\lambda_3$ is output, then is input to the optical path 37 and is output to the outside.

The above optical paths 20, 22, 24, 26, 28, 37, 40, 42 and 44 can be constructed by a coupling optical system, such as an optical fiber and lens. Particularly a polarization plane controller is installed in the middle of a series of optical paths from the output end of the continuous wave light source 16 to the optical paths 26, 24, 22 and 28, or a series of optical paths 26, 24, 22 and 28 are constructed with a polarization plane preserving optical fiber. This is for matching the polarization direction of the intermediate optical signal 114 which is input from the end face $L_2$ of the passive mode-locked laser diode and the polarization direction of the oscillation lights of the passive mode-locked lasers diode constituting the second optical converter 18 because the passive mode-locked laser diode is used as the second optical converter 18.

The first conversion means 30 and the second conversion means 52 can be integrated into one body, and therefore the total length of the above mentioned optical paths 20, 22, 24, 26, 28, 37, 40, 42 and 44 is at most about 10 cm. So by using a polarization plane controller or a polarization plane preserving optical fiber, the polarization direction of the intermediate optical signal 114, which is input from the end face $L_2$ of the passive mode-locked laser diode and the polarization direction of the oscillation light of the passive mode-locked laser diode can be easily matched.

Second Embodiment

A second embodiment, which is a different mode from the above mentioned first embodiment for implementing the optical clock signal extraction device of the first invention, will now be described with reference to FIG. 2. The difference of the second embodiment from the first embodiment is the configuration of the second conversion means. Since the configuration of the first conversion means is the same as the first embodiment, description thereof is omitted.

The second conversion means 54 of the second embodiment has an optical circulator 38, second optical converter 18 and optical band pass filter 36. The second converter 18 and the optical band pass filter 36 can be the same as the first embodiment.

Figure 2:
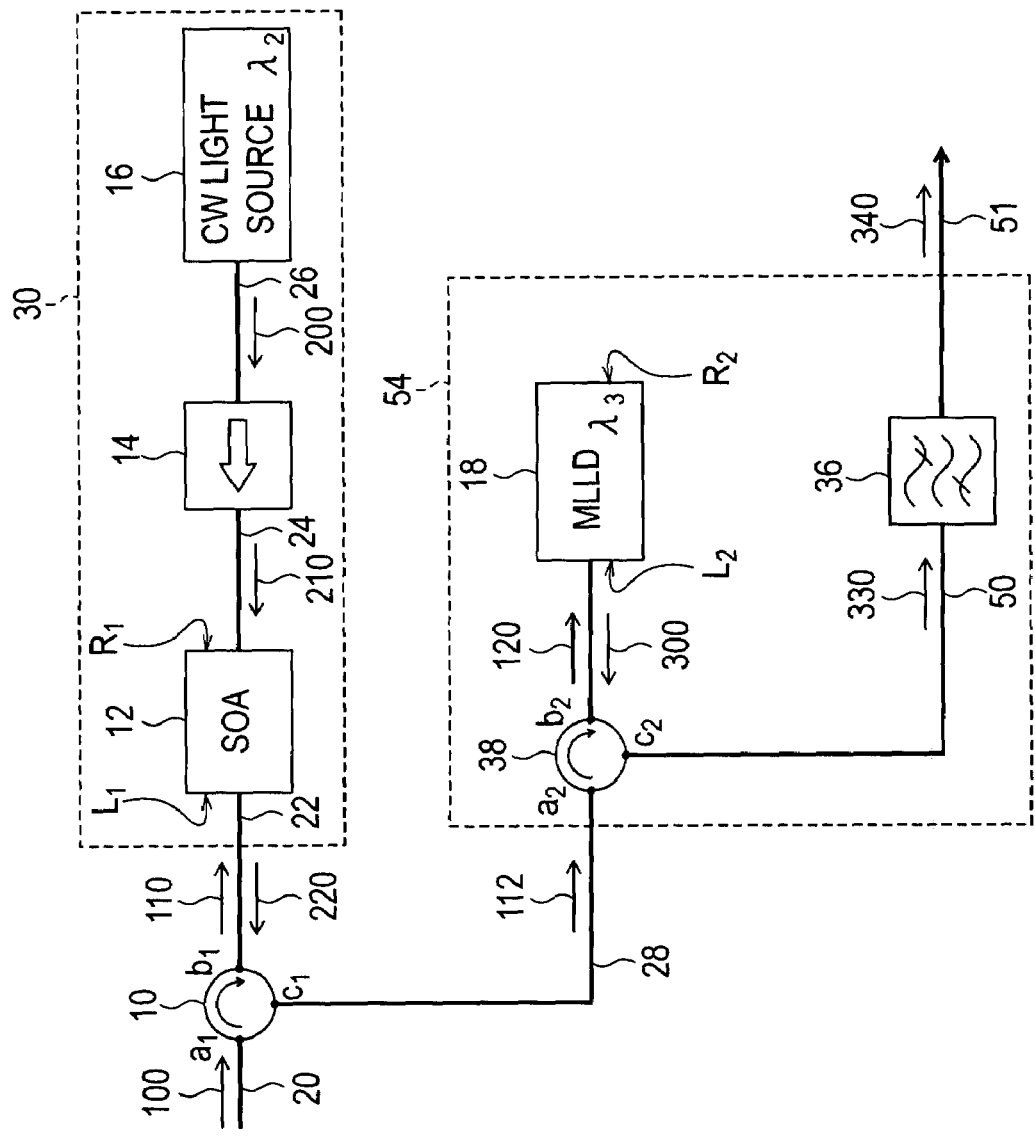
FIG. 2 is a block diagram depicting an overview of the optical clock signal extraction device according to the second embodiment.

In FIG. 2, the optical circulator 10 is the same as the optical circulator used for the first embodiment, but for distinction and to prevent confusion, the three ports of the optical circulator 10 are denoted by $a_1$, $b_1$ and $c_1$, and the three ports of the optical circulator 38 are denoted with $a_2$, $b_2$ and $c_2$.

The intermediate optical signal 112, which is output from port $c_1$ of the optical circulator 10, is input to port $a_2$ of the optical circulator 38, and is output from port $b_2$, then propagates through the optical path 23, and is input to the second optical converter 18. The optical clock signal 300 of which wavelength is $\lambda_3$, which is output from the second optical converter 18, propagates through the optical path 23, and is input to port $b_2$ of the optical circulator 38, and then is output from port $c_2$ as the optical clock signal 330. The optical clock signal 330 propagates the optical path 50, and is input to the optical band pass filter 36, and from the optical band pass filter 36, the optical clock signal 340 of which wavelength is $\lambda_3$ is output, and is input to the optical path 51 and output to the outside.

Whether the above mentioned first embodiment is used or the second embodiment is used to implement the optical clock signal extraction device of the first invention depends on the format of using the optical clock signal extraction device of the first invention, that is a matter of design.

<Passive Mode-Locked Semiconductor Laser>

The structure and the operation of the passive mode-locked laser diode, which is preferably used as the second optical converter 18, will be described with reference to FIG. 3. For certain the passive mode-locked laser diode, which is preferably used as the second optical converter 18, is not limited to the one shown in FIG. 3, but a type of passive mode-locked laser diode (MLLD), which further integrates a passive wave guide area and Bragg diffraction area, or a type in which the gain area and the saturable absorption area are further divided, can be used. Hereafter a passive mode-locked laser diode (MLLD) may be referred to as a passive MLLD or simply MLLD.

Figure 3:
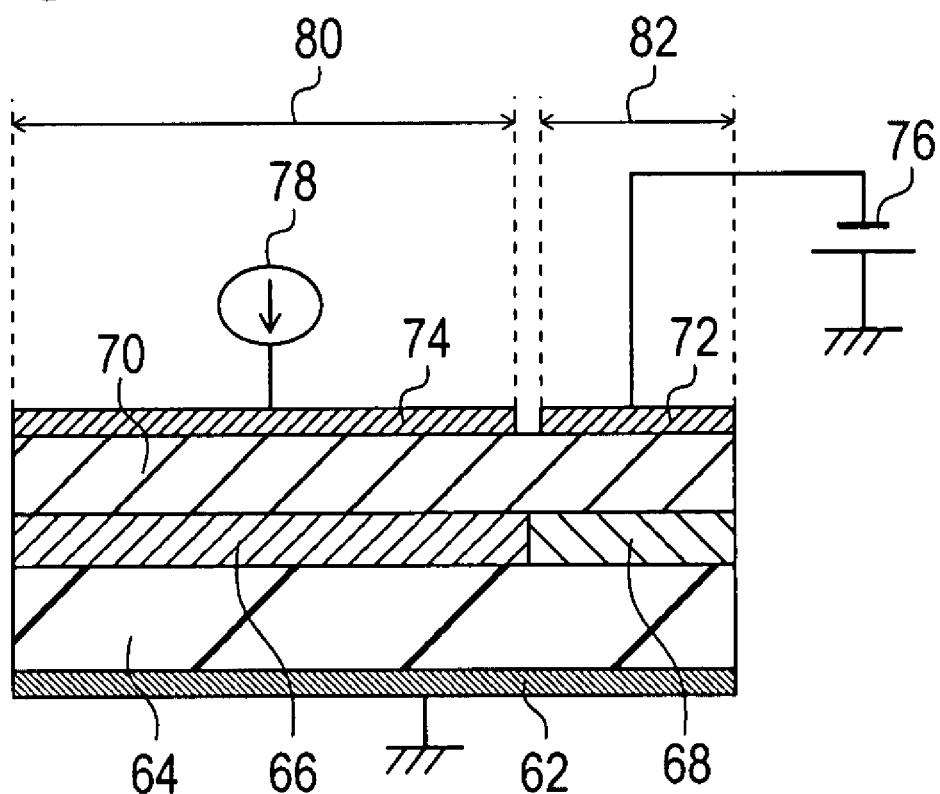
FIG. 3 is a cross-sectional view depicting an overview of the passive mode-locked laser diode.

FIG. 3 is a cross-sectional view depicting the general configuration of 2 electrode type passive mode-locked laser diodes viewed from the vertical side face with respect to the optical wave guide direction. The passive MLLD shown in FIG. 3 is a laser diode which includes a gain area 80 where an inverted population is formed and a saturable absorption area 82 which has a function to moderate the light intensity, and where the gain area 80 and the saturable absorption area 82 are positioned in a series. The gain area 80 and the saturable absorption area 82 are formed to be monolithic, as FIG. 3 shows. To the gain area 80, the current is injected by a constant current supply 78 via an n-side common electrode 62 and a p-side electrode 74 of the gain area. To the saturable absorption area 82, a reverse bias voltage is applied by a constant voltage supply 76 via the n-side common electrode 62 and the p-side electrode 72 of the saturable absorption area 82.

When current is injected to the gain area 80 and the reverse bias voltage is applied to the saturable absorption area 82, a passive mode-locking operation is generated, and an optical pulse string, of which frequency is similar to an integral multiple of a resonator frequency of MLLD, is generated. Here a frequency similar to an integral multiple of a resonator frequency of MLLD means that the difference between an integral multiple of the resonance frequency of MLLD and the frequency of the optical pulse string is small enough to be ignored compared with the resonance frequency of MLLD.

The relationship between the wavelength $\lambda_1$ of the input optical signal and the wavelength $\lambda_2$ of the continuous wave light must be set so as to satisfy the relationship that the continuous wave light of which wavelength is $\lambda_2$ can be modulated by inputting the input optical signal of which wavelength is $\lambda_1$ to the first optical converter 12, as described later. In other words, it is necessary that both wavelength $\lambda_1$ and wavelength $\lambda_2$ are within the gain band of, the first optical converter 12. On the other hand, the relationship of the wavelength $\lambda_2$ of the continuous wave light and the oscillation spectrum of MLLD must be set so that $\lambda_2$ is approximately the same as a wavelength corresponding to one-longitudinal mode of a plurality of longitudinal modes of the MLLD. Here "approximately the same" means that the difference between one longitudinal mode of a plurality of longitudinal modes of the MLLD and the wavelength $\lambda_2$ is small enough to be ignored compared with the longitudinal mode interval.

The optical wave guide 66 existing inside the gain area 80 (hereafter may be called "optical wave guide 66 in the gain area 80") and the optical wave guide 68 existing inside the saturable absorption area 82 (hereafter may be called "optical wave guide 68 in the saturable absorption area 82") are both constructed between a common first clad layer 64 and second clad layer 70. Here the first clad layer 64 is the n-type clad layer and the second clad layer 70 is the p-type clad layer. The crystal materials of the optical wave guide 66 and the optical wave guide 68 are determined by the wavelength of the input optical signal to be input to MLLD. For example, if the wavelength of this input optical signal is the 1.5 μm band, then a quantum-well structure formed with InP semiconductor bulk crystal material or InP semiconductor crystal material is used.

Here the polarization state of the input optical signals is defined as follows. The case when the direction of the polarization plane of the light guiding through the optical wave guide 66 and the optical wave guide 68 (vibration plane of the electric field vector of the light) is in parallel with the width direction of these optical wave guides is TE polarization, and the case when this is in parallel with the thickness direction (vertical direction in FIG. 1) is TM polarization.

In the following description, it is assumed that the optical wave guide 66 of the gain area 80 is formed by bulk crystals or a strained-layer quantum-well, and the polarization state of the oscillation light of the MLLD is TE polarization. Hereafter the laser oscillation operation in which oscillation light is TE polarization may be called TE mode operation, and the wave guiding mode of the oscillation light in the optical wave guide 66 and the optical wave guide 68 may also be called TE mode. In the same way, the laser oscillation operation in which oscillation light is TM polarization may be called TM mode operation, and the wave guiding mode of the oscillation light in the optical wave guide 66 and the optical wave guide 68 may be called TM mode.

<Optical Clock Signal Extraction Operation>

The operation principle of the optical clock signal extraction device of the first invention will be described in the sequence of (A) First conversion step and (B) Second conversion step.

(A) First Conversion Step

The first conversion step is inputting the input optical signal and continuous wave light into the first optical converter, and generating an intermediate optical signal, which does not depend on the polarization direction of the input optical signals, by the XGM effect which is manifested by the input optical signal and continuous wave light, and outputting the intermediate optical signal from the first optical converter. Here the case when an SOA is used for the first optical converter will be described as an example.

Optical elements that can be used as the first optical converter, other than SOA, are an optical element based on a saturable absorber or EAM, for example, as mentioned later.

When the input optical signal of which wavelength $\lambda_1$ is input to SOA, induced emission is enhanced by the input optical signal, so the carrier density in SOA decreases. As a result, the optical gain of the SOA decreases. If the input optical signal which is input to SOA is an RZ signal, the optical gain of SOA decreases in an instant when the optical pulse constituting the input optical signal is input to SOA, and the optical gain of the SOA is maintained in an instant when the optical pulse is not input to the SOA. In other words, the optical gain and carrier density of the SOA are modulated to a pattern when the RZ signal pattern of the input optical signal is inverted.

This is described concretely. For example, the case when the RZ signal pattern of the input optical signals of which wavelength is $\lambda_1$ is (1, 1, 0, 0, 0, 1, 1, 1, 0, . . .) will be described. Here an optical pulse exists in a bit "1" and an optical pulse does not exist in a bit "0". If the case when the optical gain of an SOA is decreased is represented by "0" and the case when the optical gain is maintained is represented by "1", then the optical gain of SOA is "1" at portion "0" in the above mentioned RZ signal pattern, and "0" at portion "1". Therefore the pattern of the optical gain is (0, 0, 1, 1, 1, 0, 0, 0, 1, . . . ) if represented by the same format as the above mentioned RZ signal pattern. Therefore modulation performed here is logical inversion, where portion "0" becomes "1" and portion "1" becomes "0".

When the continuous wave light of which wavelength is $\lambda_2$, which is different from the wavelength of the input optical signal, is input to the SOA where modulation is being performed on optical gain with a logically inverted pattern of the RZ signal pattern of the input optical signal, this modulation of the optical gain is converted into continuous wave light, and an intermediate optical signal of which wavelength is $\lambda_2$ is generated and output from SOA. In other words, if the optical gain of the SOA decreases (the case represented by "0"), the continuous wave light of which wavelength is $\lambda_2$ is absorbed. If the optical gain of the SOA is maintained (the case represented by "1"), the continuous wave light of which wavelength is $\lambda_2$ is not absorbed but amplified. As a result, the RZ signal pattern of the input optical signal of which wavelength is $\lambda_1$ is copied to the intermediate optical signal of which wavelength is $\lambda_2$, although the RZ signal pattern of the input optical signal and the intermediate optical signal of which wavelength is $\lambda_2$ have a logically inverted relationship.

As described above, the phenomena where the RZ signal pattern of the input optical signal interacts with the continuous wave light of which wavelength is $\lambda_2$, and is copied and generated as intermediate optical signal of which wavelength is $\lambda_2$, is called the "XGM effect". In the following description, cross gain modulation may be called XGM. The XGM effect is widely used as a means of implementing the wavelength conversion required for implementing various applications in optical communication systems.

It can be said that the first conversion step is a step of converting the RZ signal pattern of the input optical signal of which wavelength is $\lambda_1$ into continuous wave light using the XGM effect, and generating an intermediate optical signal of which wavelength is $\lambda_2$. The condition of the input optical signal is that wavelength $\lambda_1$ exists in a wavelength band where the carrier density of the SOA can be modulated. The condition of the continuous wave light is that wavelength $\lambda_2$ exists in a wavelength band where the optical gain changes along with the modulation of the carrier density, which is caused by the input optical signal. More specifically, the condition is that wavelength $\lambda_1$ and wavelength $\lambda_2$ both exist in a gain band of the SOA.

The signal pattern of the intermediate optical signal of which wavelength is $\lambda_2$ and the RZ signal pattern of the input optical signal are in a logically inverted relationship, but an optical clock signal, which is an optical pulse string where optical pulses are regularly lined up on the time axis with a predetermined time interval, is finally generated and output by the optical clock signal extraction device of the first invention. Therefore being in a logically inverted relationship causes no problem to achieve the object of extracting optical clock signals.

In FIG. 1 and FIG. 2, the intermediate optical signal 220 propagates to the left in the optical path 22 for propagating the intermediate optical signal 220 which is output from the SOA 12, and at the same time, the input optical signal component which is reflected and output from the SOA 12 also propagates to the left. Therefore the intermediate optical signal 220 and the input optical signal component which is reflected and output from the SOA 12 interfere, and the input optical signal component which is reflected is input to the passive mode-locked laser diode constituting the second optical converter 18 with the fluctuation component caused by this interference. If the input optical signal components of which intensity fluctuates are input to the passive mode-locked laser diode, and operation of the passive mode-locked laser diode becomes unstable, which is not desirable. Therefore it is preferable that the optical clock signal extraction device is constructed such that the intermediate optical signal 220 does not interfere with the input optical signal component.

For this, in the optical clock signal extraction device in the first invention shown in FIG. 1 and FIG. 2, non-reflective film coating processing is performed on the end faces facing each other (end face L1 and end face R1) of the SOA 12. In other words, in the case of the optical clock signal extraction device of the first invention shown in FIG. 1 and FIG. 2, the input optical signal 110 and the continuous wave light 210 of which wavelength is $\lambda_2$ are input to the SOA 12 from the end faces facing each other (end face L1 and end face R1) of the SOA 12 of which non-reflective film coating is performed. Therefore from the end face L1 of the SOA, only the intermediate optical signal 220 is output to the left to the optical path 22, and no input optical signal component which propagates to the left through the optical path 22 exists. Therefore the intermediate optical signal 220 does not interfere with the input optical signal 110, and the above mentioned input optical signal of which intensity fluctuates is not input to the passive mode-locked laser diode.

An important point in the first conversion step is manifesting the XGM effect without depending on the polarization direction of the input optical signal 110. SOA, in which the XGM effect is manifested without depending on the polarization direction of the input optical signal, can be easily implemented by forming the active layer (that is optical amplification area) thereof by bulk crystals or a strained-layer quantum-well structure as known conventionally. In other words, the XGM effect can be manifested without depending on the polarization direction of the input optical signal by using a semiconductor optical amplifier of which active layer is formed by bulk crystals or a strained-layer quantum-well structure as the first optical converter, and by this, the first conversion step can be implemented.

Figure 4A:
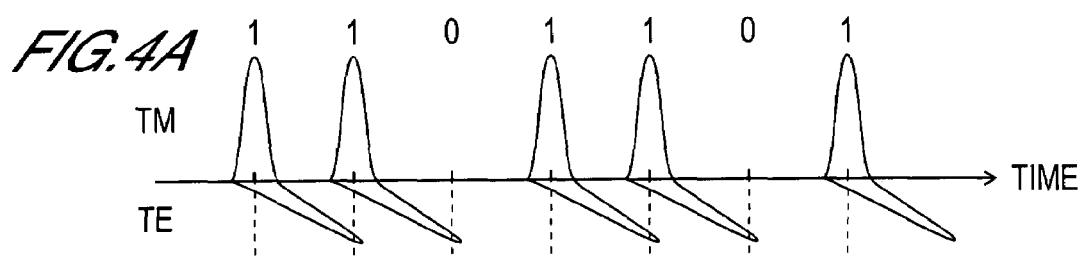
FIG. 4 are diagrams depicting the time-based waveforms of the input optical signal, intermediate optical signal and optical clock signal.

Now the polarization directions of the input optical signals 100 and 110 and the intermediate optical signals 220, 112 and 120 will be described with reference to FIG. 4A and B. FIG. 4A, B and C are diagrams depicting the waveforms in the time domain of the input optical signals 100 and 110, intermediate optical signals 220, 112 and 120, and optical clock signal 300. FIG. 4C will be referred to mainly in the description of the second conversion step.

The abscissa of FIG. 4A, B and C indicates time in an arbitrary scale, and the intensity of the TE polarization component and TM polarization component are shown as a perspective view from the direction perpendicular to the abscissa (time axis) respectively.

Since the polarization directions of the input optical signals 100 and 110 are not determined, both the TE polarization component and TM polarization component are included, as shown in FIG. 4A. The input optical signal is an RZ signal, so there is a place on the time axis (may be called time slot) where an optical pulse exists, or a time slot where an optical pulse does not exist. In the figures, "1" is a time slot where an optical pulse exists, and "0" is a time slot where an optical pulse does not exist. In other words, it is assumed that the RZ signal (1, 1, 0, 1, 1, 0, 1) is the input optical signal.

Figure 4B:
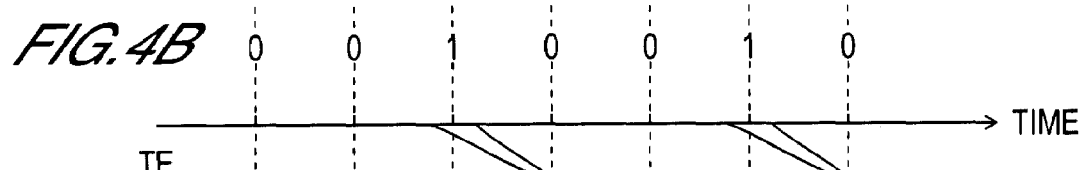
Figure 4C:
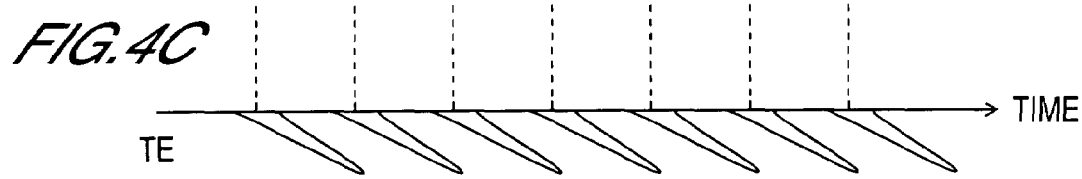

The intermediate optical signals 220, 112 and 120 have only TE components, as shown in FIG. 4B, so that the polarization direction becomes the same as the polarization direction of the oscillation light of the MLLD. The intermediate optical signals 220, 112 and 120 have a logically inverted relationship with the RZ signal pattern of the input optical signal, so the RZ signal of the intermediate optical signal is (0, 0, 1, 0, 0, 1, 0).

(B) Second Conversion Step

The second conversion step is a step of inputting the intermediate optical signal into the second optical converter, and generating the optical clock signal of which repeat frequency is f and wavelength is $\lambda_3$ by the passive mode-locking operation of the second optical converter, and outputting them. Here the case when MLLD is used for the second optical converter will be described as an example.

When the intermediate optical signal is input to the MLLD 18, the polarization direction thereof must match the polarization direction of the oscillation light of the MLLD 18. Here the intermediate optical signal specifically means the intermediate optical signal 114, which is output from the optical isolator 32 in the optical clock signal extraction device shown in FIG. 1, and also means the intermediate optical signal 120 which is output from port $b_2$ of the optical circulator 38 in the optical clock signal extraction device shown in FIG. 2.

In order to match the polarization direction of the intermediate optical signal and the polarization direction of the oscillation light of the MLLD 18, the optical path from the SOA 12 to the MLLD 18 via the optical circulator is formed by an optical system in which the polarization direction of the light propagating through this optical path can be maintained.

If the intermediate optical signal is input to the MLLD 18 in a state matching with the polarization direction of the oscillation light of the MLLD 18, the passive mode-locking operation is manifested, and optical clock signal 300 is generated in the MLLD 18.

The optical clock signal 300 of which wavelength is $\lambda_3$ generated in the MLLD 18 has a polarization direction which matches that of the oscillation light of the MLLD 18, so as FIG. 4C shows, the optical clock signal 300 is an optical pulse string which has only TE component. The signal pattern of the intermediate optical signal of which wavelength is $\lambda_2$ and the RZ signal pattern of the input optical signal have a logically reversed relationship, therefore both signal patterns have time slots where an optical pulse does not exist. The optical clock signal which is generated by the MLLD, on the other hand, is an optical pulse string where optical pulses line up on the time axis with a predetermined time interval as shown in FIG. 4C.

The intermediate optical signal is generated without depending on the polarization direction of the input optical signal 100 in the SOA 12, propagates through the optical path created by the optical system in which the polarization direction is maintained, as mentioned above, and is input to the MLLD 18. Therefore in the intermediate optical signal to be input to the MLLD 18, the polarization direction thereof (TE polarization in this case) is always maintained regardless how the polarization direction of the input optical signal 100 changes. Therefore no matter how the polarization direction of the input optical signal 100 changes, an optical clock 300 is stably extracted by the MLLD 18.

Critical in the second conversion step is that the multiple modulation effect, caused by the resonator effect manifested inside the resonator of the MLLD 18, is actively used. This multiple modulation effect can implement the following two advantages. First, extraction of optical clock signals is possible even if the intensity of the input optical signals is weak. Second, the pattern effect, which is generated when the first conversion step is executed, can be absorbed. These two points will now be described in detail.

First the multiple modulation effect caused by the resonator effect will be described. The principle of the optical clock signal being extracted from the intermediate optical signal is that the light absorption coefficient of the saturable absorption area is modulated by the optical pulses constituting the input optical signal, and the repeat frequency of the MLLD is locked to the frequency corresponding to the bit rate of the input optical signal. If the intermediate optical signal is input to the MLLD, the optical pulses constituting the intermediate optical signal are reflected by the end face of the resonator (corresponds to the end face $L_2$ or end face $R_2$ in FIG. 1 and FIG. 2) of the MLLD, and resonate in the resonator of the MLLD. In other words, the optical pulses constituting the intermediate optical signal passes through the saturable absorption area of the MLLD for a plurality of times, and modulate the light absorption coefficient of the saturable absorption area at every passing.

It is assumed that the wavelength ($\lambda_2$ in this case) of the intermediate optical signal to be input to the MLLD is a wavelength that can satisfy the resonance conditions of the MLLD. In this case, one of the optical pulses constituting the intermediate optical signal that reached the saturable absorption area of the MLLD, and one of the optical pulses constituting the intermediate optical signal which was input to the MLLD before this optical pulse is input and already reached this saturable absorption area after resonating in the resonator of the MLLD a plurality of times, have the same phase. In other words, both of these pulses interfere in the saturable absorption area, and intensity thereof is enhanced. As a result, the intensity of optical pulses which the saturable absorption area actually receives becomes stronger than the light intensity of a single optical pulse, and the light absorption coefficient of the saturable absorption area is modulated more strongly.

On the other hand, if the wavelength ($\lambda_2$ in this case) of the intermediate optical signal to be input to the MLLD is a wavelength which does not satisfy the resonance conditions of the MLLD, both of the above mentioned pulses do not have a same pulse in the saturable absorption area. As a result, the modulation effect of the light absorption coefficient of the saturable absorption area becomes small. If the wavelength of the intermediate optical signal is a wavelength that satisfies the resonance conditions of the MLLD, the passive mode-locking operation of the MLLD can be implemented even if the intensity of the intermediate optical signal is weak. This means that even if the intensity of the input optical signal is weak and therefore the intensity of the intermediate optical signal is also weak, the optical clock signal can be extracted stably, which is an excellent effect.

The above description can be summarized as follows. In a method of implementing the second conversion by an MLLD having a gain area and a saturable absorption area, if one of the oscillation longitudinal modes of the MLLD is set to a value close to $\lambda_2$, which is the wavelength of the intermediate optical signal, and the optical clock signal extraction method is executed, optical clock signals can be extracted at higher sensitivity. In other words, even if the intensity of the input optical signal is weak, optical clock signals can be extracted efficiently. Also as described later, this method is effective to decrease the time jitter of the optical signals to be extracted as mentioned later.

Specifically, that one of the longitudinal oscillation modes of the MLLD is a value close (approximately the same as) to $\lambda_2$, which is the wavelength of the intermediate optical signal, means that $\lambda_2$ has a value close to one of the longitudinal oscillation mode of the MLLD so that the above optical pulses can be regarded as the same phase in the saturable absorption area of MLLD, that is the multiple modulation effect is manifested. In other words, that one of the longitudinal oscillation modes of MLLD is approximately the same as $\lambda_2$, which is the wavelength of the intermediate optical signal, means that the difference between one longitudinal mode of the longitudinal modes of the MLLD and the wavelength $\lambda_2$ is small enough to be ignored compared with the longitudinal mode interval.

To confirm the above resonance effect, the inventor of this optical clock signal extraction device performed the following experiment. In other words, into a conventional MLLD (repeat frequency of the MLLD used for this experiment is 40 GHz) which has a gain area and a saturable absorption area constructed by a strained-layer quantum-well structure having an identical composition, a master optical pulse string with low jitter, which has a repeat frequency approximately matching with the repeat frequency 40 GHZ of this MLLD, is injected into this MLLD, and the decrease of time jitter of the optical pulse string, which is output from the MLLD, was confirmed. In this experiment, the central wavelength of the master optical pulse string is changed, and the change of the time jitter of the optical pulse string to be output from the MLLD along with this change was observed. In the experiment, the polarization direction of the master optical pulse string was adjusted and experimented with, so that TE polarization becomes the same TE polarization as the polarization direction of the oscillation light of MLLD.

Figure 5:
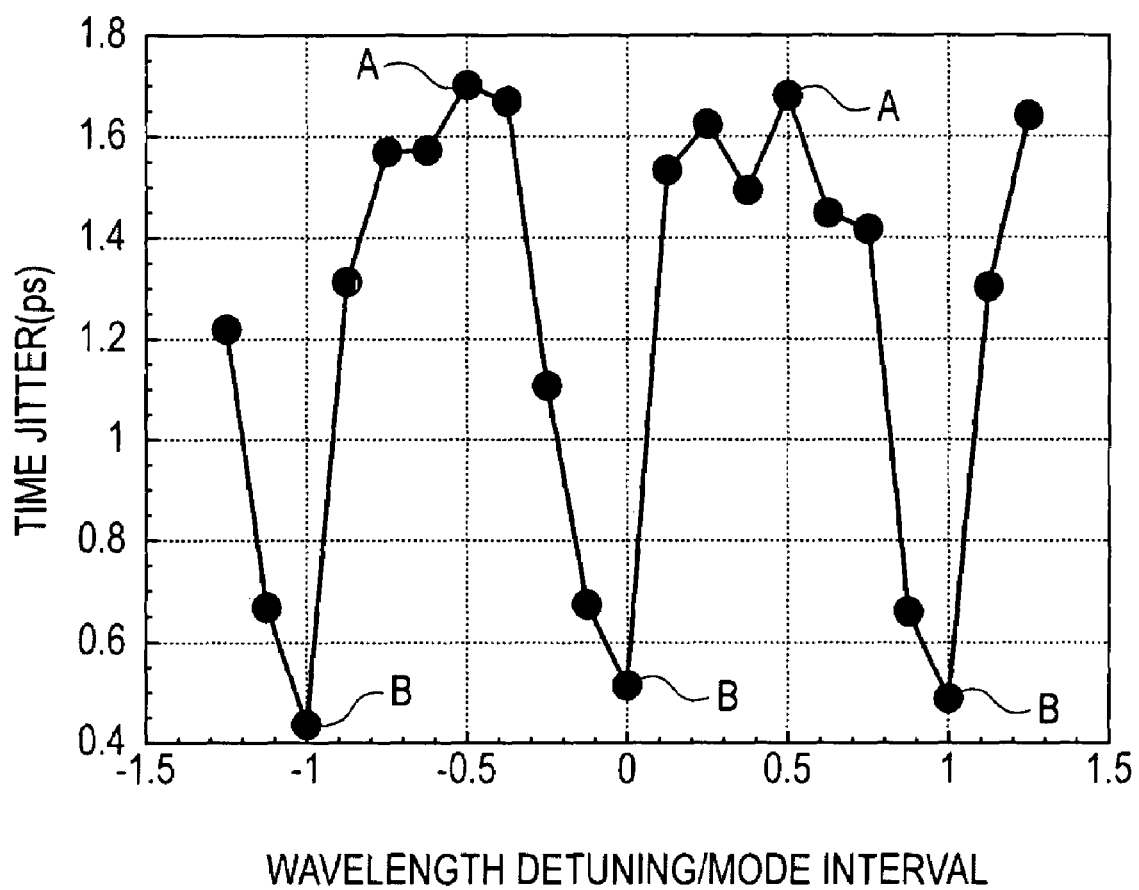
FIG. 5 is a graph depicting the characteristics of the time jitter with respect to the ratio of the wavelength detuning and mode interval.

The experiment result will be described with reference to FIG. 5 and FIGS. 6A and B. FIG. 5 is a graph depicting the characteristics of the time jitter with respect to the ratio of the wavelength detuning and longitudinal mode interval for describing the time jitter characteristics, and FIGS. 6A and B are diagrams depicting the operation principle of the passive mode-locking. The abscissa of the graph in FIG. 5 is a value when the wavelength detuning is divided by the longitudinal mode interval, and the ordinate indicates the magnitude of the time jitter in ps (pico second) units. The wavelength detuning is a difference between the central wavelength of MLLD and the central wavelength of the master optical pulse string. When the value, when the wavelength detuning value is divided by the longitudinal mode interval shown in the abscissa in FIG. 5, is an integer, this means that the master optical pulse string satisfies the resonance conditions of the MLLD.

Figure 6A:
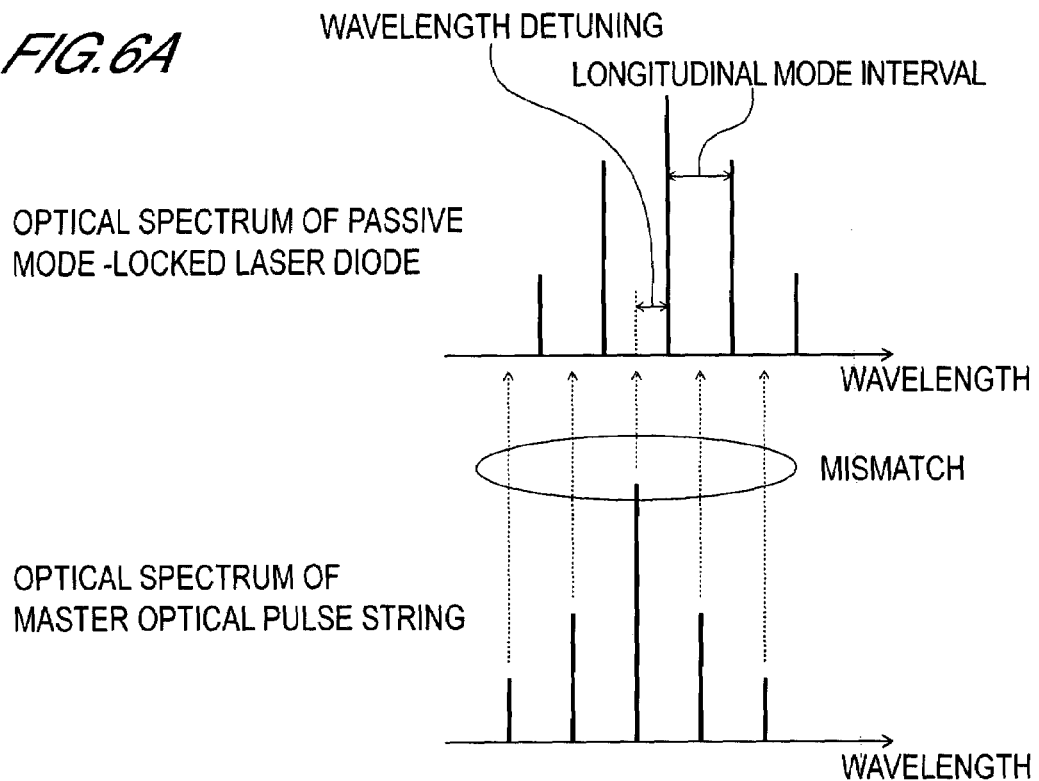
FIG. 6 are diagrams depicting the operation principle of the passive mode-locking.

In FIGS. 6A and B, the abscissa indicates the wavelength in an arbitrary scale. The ordinate, which is omitted, indicates the light intensity in the ordinate direction in an arbitrary scale.

Figure 6B:
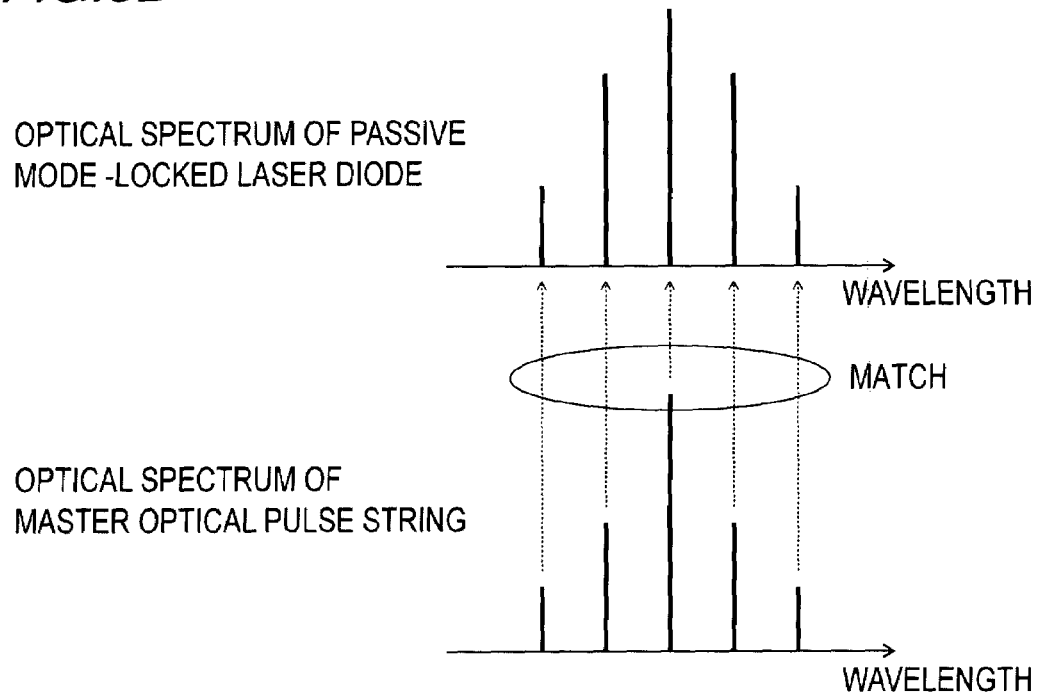

FIG. 6A is an oscillation spectrum of MLLD in the case when the longitudinal mode does not match the optical spectrum of the master optical pulse string. FIG. 6B shows the case when the longitudinal mode of MLLD matches the optical spectrum of the master optical pulse string. In FIG. 5, the observed value indicated by A is a value of time jitter which is observed when the oscillation spectrum of MLLD and the optical spectrum of the master optical pulse string do not match, that is, in the relationship shown in FIG. 6A. The observed value indicated by B is a value of time jitter which is observed when the oscillation spectrum of MLLD and the optical spectrum of the master optical pulse string match, that is, in the relationship shown in FIG. 6B.

As the above described experiment result shows, when the wavelength of the master optical pulse string does not match the wavelength of the resonator of the MLLD, that is, when the wavelength of the master optical pulse string is at the mid-position of the adjacent longitudinal modes and does not match the oscillation spectrum of MLLD (observed value indicated by A), the time jitter of the optical pulse string to be output from the MLLD is at the maximum. In this case, the intensity of the master optical pulses to be injected to the MLLD, required for decreasing the time jitter of the optical pulse string to be output from the MLLD, becomes highest.

On the other hand, in the case when the wavelength of the master optical pulse string matches with the oscillation spectrum of the MLLD (observed value indicated by B), the time jitter of the optical pulse string to be output from the MLLD becomes very small, which means that the intensity of the master optical pulse to be injected to the MLLD, required for decreasing the time jitter, can be minimized.

As the above described experiment result shows, the intensity of injection light required for decreasing the time jitter of the optical pulse string to be output from the MLLD can be decreased by using the resonance effect of the master optical pulse string (that is, injection light) in the resonator of the MLLD. In order to satisfy the conditions for manifesting the resonance effect, the wavelength of the intermediate optical signal (that is, wavelength spectrum of intermediate optical signal) is approximately matched with one of the longitudinal oscillation modes of the MLLD.

In the optical clock signal extraction device in the first invention, the injection light corresponding to the master optical pulse string to be injected into the MLLD is the intermediate optical signal, and the wavelength of the signal is uniquely defined by the output wavelength of the continuous wave light source of the first conversion means (continuous wave light source 16 which outputs wavelength $\lambda_2$ in this case). The continuous wave light source of the first conversion means is a light source, such as a laser diode installed in the device, and it is easily implemented to set the wavelength so as to match one of the longitudinal oscillation modes of the MLLD.

The resonance conditions in the MLLD, which is used as the second optical converter, do not depend on the wavelength ($\lambda_1$ in this case) of the input optical signals. In other words, even if the wavelength of the input optical signal to be input to the optical clock signal extraction device changes from $\lambda_1$ after long distance transmission in the optical fiber transmission line, the resonance conditions in the MLLD are defined by the wavelength ($\lambda_2$ in this case) of the continuous wave light source of the first conversion means, so the change of the wavelength of the input optical signal does not influence the extraction operation of the optical clock signals.

Now the absorption function of the pattern effect, which is generated when the first conversion step is executed, will be described with reference to FIGS. 7A1 to B3. FIG. 7A1 to A3 show the case when the recovery speed of the carrier density in SOA has sufficient speed compared with the bit rate of the input optical signal (that is, the case when the response speed of SOA is fast), and FIG. 7B1 to B3 show the case when the recovery speed of the carrier density in SOA is slow compared with the bit rate of the input optical signal (that is, the case when the response speed of SOA is slow). In FIG. 7A1 to B3, the abscissa is the time axis which indicates time in an arbitrary scale. FIGS. 7A1 and B1 show the time waveform of the input optical signal, and the ordinate direction indicates the light intensity in an arbitrary scale. FIGS. 7A2 and B2 show the time-based change of the carrier density in SOA, and the ordinate direction shows the carrier density in an arbitrary scale. FIGS. 7A3 and B3 show the waveform in the time domain of the intermediate optical signal, and the ordinate direction shows the light intensity in an arbitrary scale.

In the first conversion step, the intermediate optical signal is generated by the XGM effect in the SOA. The response speed of the XGM effect is controlled by the recovery speed of the carrier density after an optical pulse, constituting the input optical signal, is input to the SOA. The recovery speed of the carrier density is controlled by the carrier life based on the inter-band transition in the SOA, and the carrier life is about several hundred ps (pico seconds) to sever ns (nano seconds).

When the bit rate of the input optical signal is sufficiently slow compared with the carrier life of the SOA, the carrier density of the SOA recovers to the state before an optical pulse, constituting the input optical signal, was input, during the period between the input of an optical pulse to the SOA and input of an optical pulse next. In other words, the optical gain of the SOA always recovers to the original non-saturated level, which is the optical gain of the SOA when an optical pulse is not input, before and after the input of the optical pulse.

In this case, the optical gain of the SOA always takes a constant value regardless whether an optical pulse exists or not on the time axis, without depending on the pattern history of the RZ signal, which is the input optical signal. Therefore as FIG. 7A1 to A3 show, the waveform in the time domain of the intermediate optical signal (shown in FIG. 7A3) is always generated as a pattern in which logic is inverted with respect to the optical pulse constituting the input optical signal (shown in FIG. 7A1).

On the other hand, when the bit rate of the input optical signal is sufficiently fast compared with the carrier life of the SOA, the carrier density of the SOA does not recover to the state before an optical pulse, constituting the input optical signal, was input, during the period between the input of an optical pulse to the SOA and the input of an optical pulse next. The degree of recovery of the carrier density of SOA greatly depends on the pattern history of the RZ signal, which is an input optical signal.

For example, if "1" is continuously input (optical pulses are continuously input), optical pulses are continuously input to the SOA of which carrier density is in a low state. If "0" is continuously input, that is, if optical pulses are not continuously input, on the other hand, an optical pulse which means that "1" subsequent to inputting "0" is input to the SOA of which carrier density is in a recovered state. Therefore the optical gain of the SOA depends on the pattern history of the RZ signal, and does not take a constant value. The phenomena where the optical gain of the SOA depends on the pattern history of the RZ signal in this way is called a "pattern effect".

When the pattern effect is manifested, the intensity of the optical pulses constituting the intermediate optical signal disperses. As a result, a quenching ratio of the intermediate optical signal decreases, and affects the optical pulse generation step (second conversion step) to be executed by the second conversion means.

Figure 8:
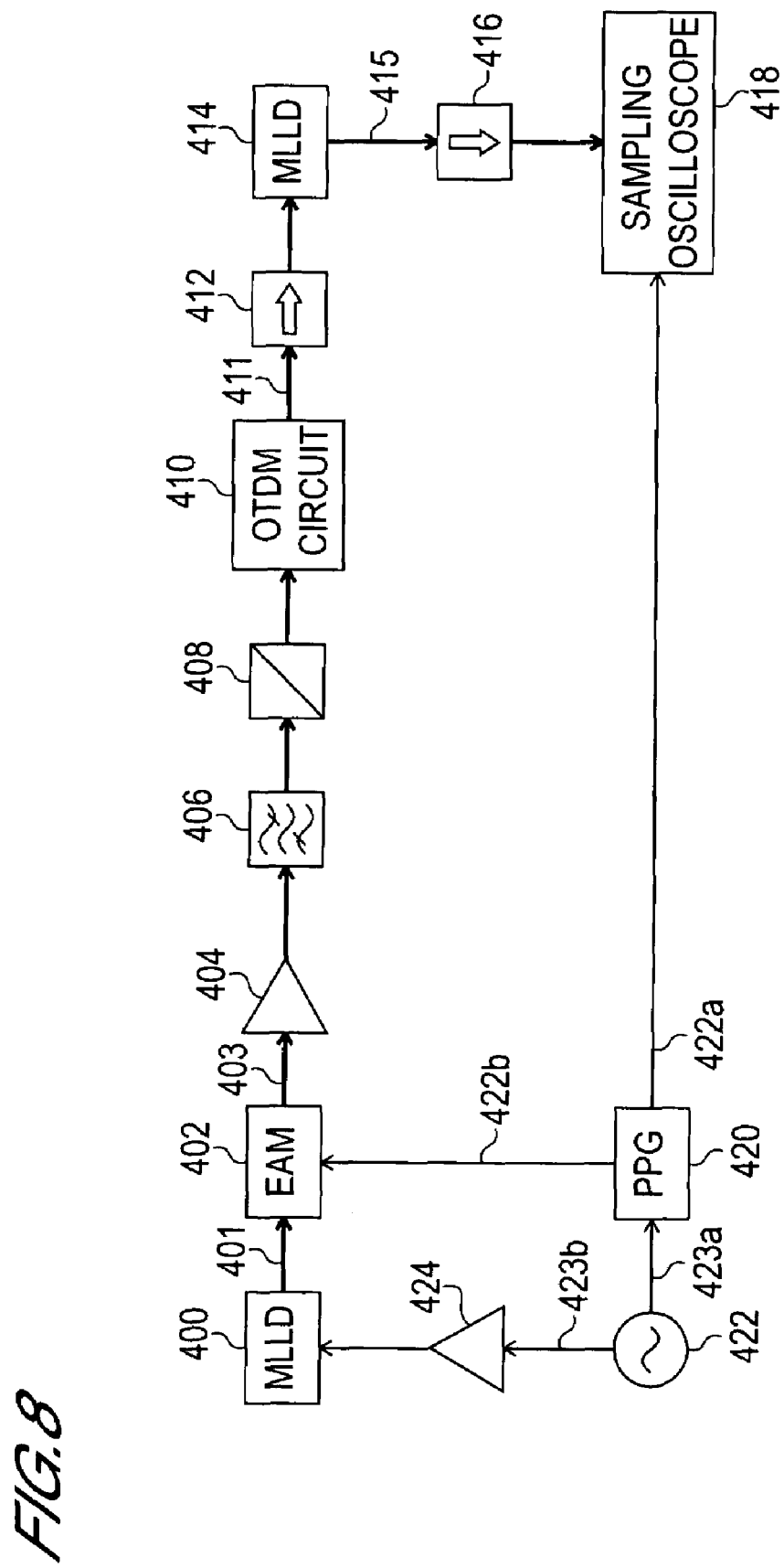
FIG. 8 is a block diagram depicting an overview of the device used for optical clock signal extraction experiment.

However the inventor of this invention has already confirmed that the above mentioned pattern effect can be absorbed by extracting the optical clock signal using the MLLD (see S. Arahira, S. Sasaki, K. Tachibana, Y. Ogawa, "All-optical 160-Gb/s clock extraction with a mode-locked laser diode module," IEEE Photon. Technol. Lett. vol. 16, No. 6, pp. 1558-1560, June 2004.). Now the experiment result of the absorption of the pattern effect will be described. In this experiment, an all-optical clock signal extraction method with 160 Gbit/s was tested using the MLLD of which repeat frequency is 160 GHz. FIG. 8 shows the block diagram of the device used for the optical clock signal extraction experiment.

First the pseudo-RZ signal 403 with 40 Gbit/s was generated using the MLLD (active mode-locked laser diode) 400 of which repeat frequency is 40 GHz, and EAM 402. A 40 Gbit/s optical pulse string was amplified by the Erbium-Doped Fiber Amplifier (EDFA) 404, then multiplexed by 4 (that is multiplexed by 4) by the Optical Time Division Multiplexing (OTDM) circuit 410 formed with a glass substrate via the optical band pass filter 406 and polarization plane controller 408, to generate the 160 Gbit/s optical pulse string 411.

The optical pulse string 411 was input from the end face at one side (illustration is omitted) of the 160 GHz MLLD (passive mode-locked laser diode) 414 via the optical isolator 412, and the 160 Gbit/s optical pulse string 415 (corresponds to 160 GHz optical clock signal), which is output from the other end face (illustration is omitted), was observed by the sampling oscilloscope 418 via the optical isolator 416.

Here the OTDM circuit 410 was intentionally set so that the positions of the optical pulses on the time axis, corresponding to the peak intensity and the time jitter of an optical pulse constituting the optical pulse string 411 (multiplexed signal) which is output from the OTDM circuit 410, is dispersed. Also the pulse width of the optical pulse constituting the optical pulse string 411 was set to 4 ps. On the other hand, the time slot of the optical pulse string 411 was set to 6.3 ps. The pulse width of the optical pulse and the time slot of the optical pulse string (4 ps and 6.3 ps respectively) are values sufficiently close so as to manifest the effect of interference. Therefore the pulse width (4 ps) of the optical pulse constituting the optical pulse string 411 was set wide enough to manifest the influence of interference between optical pulses.

The 39.67137 GHz sine wave signal 423a is supplied from the reference frequency signal generator 422 to the pulse pattern generator 420, and the trigger signal 422a is supplied from the pulse pattern generator 420 to the sampling oscilloscope 418. From the pulse pattern generator 420 to the EAM 402, pseudo-random data 422b (corresponds to the RZ signal in normal optical communication) is supplied. On the other hand, the 39.67137 GHz sine wave signal 423b is supplied from the reference frequency signal generator 422 to the MLLD 400 via the electric amplifier 424. By this, via MLLD 400, the optical pulse string 401, synchronizing the 39.67137 GHz sine wave signals 423a and 423b, is generated from the reference frequency signal generator 422, and is output. The optical pulse string 401 is input to the EAM 402, and the pseudo-RZ signal 403 is generated and output. And the pseudo-RZ signal 403 is multiplexed by 4 (that is multiplied by 4) by the OTDM circuit 410, as mentioned above, and a 160 Gbit/s optical pulse string 411 is generated.

Figure 9A:
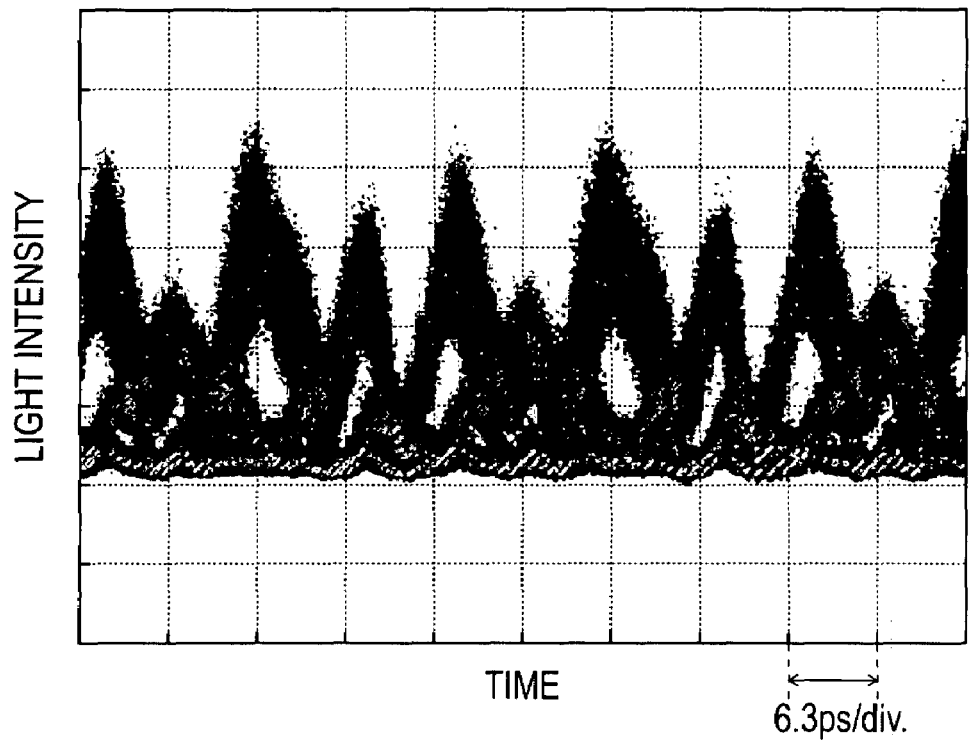
FIG. 9 are diagrams depicting the waveforms in the time domain of the input optical signal and optical clock signal.
Figure 9B:
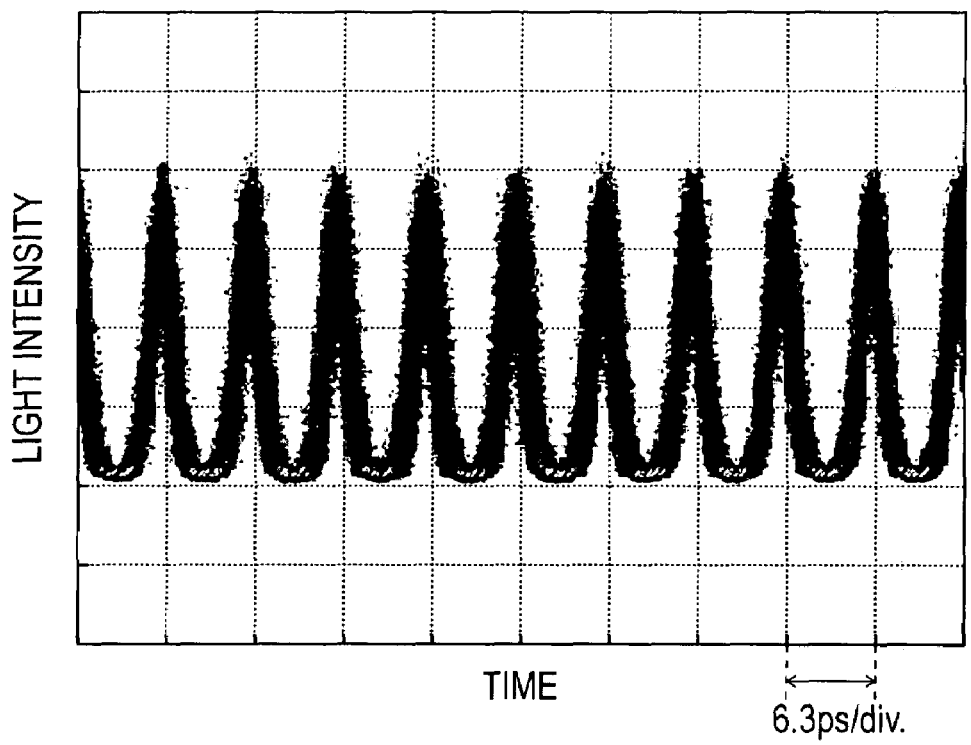

The experiment result on the absorption of the pattern effect will now be described with reference to FIGS. 9A and B. FIG. 9A shows a waveform in the time domain of the optical pulse string 411 corresponding to the input optical signal, and FIG. 9B shows a time-based waveform of the optical pulse string 415 corresponding to the regenerated optical clock signals. The abscissa in FIGS. 9A and B is a time axis, which is graduated with an interval corresponding to 6.3 ps. The ordinate in FIGS. 9A and B is light intensity graduated with an arbitrary scale.

In the waveform in the time domain of the optical pulse string 411 corresponding to the input optical signal in FIG. 9A, the optical pulse intensity disperses and time jitter also exists, as mentioned above. However in the optical pulse string 415 corresponding to the optical clock signal extracted from the optical pulse string 411 by the MLLD 414, the peak intensity of the optical pulses constituting the optical pulse string 415 is completely aligned, and time jitter does not exist. In other words, the peak positions of the optical pulses constituting the optical pulse string 415 are lined up on the time axis at an equal interval. According to the experiment result shown in FIGS. 9A and B, it is confirmed that the pattern effect can be absorbed by using the method of extracting the optical pulse signal using the MLLD.

The above result can be explained by the multiple modulation effect in the MLLD, just like the above mentioned resonator effect. In other words, by the multiple modulation effect by the optical pulses which resonate in the resonator of the MLLD, the time-based modulation amount of the optical absorption coefficient of the saturable absorption area in the MLLD is averaged. As a result, even if the time interval and peak intensity of the optical pulses to be input disperse, this dispersion is averaged in terms of time, and is corrected to a state where dispersion virtually does not exist.

As described above, even if the time interval and peak intensity of the optical pulses to be input disperse by the pattern effect, this dispersion is absorbed in the MLLD, and an optical pulse string, where optical pulses having an equal peak intensity line up at an equal interval, is generated and output. As a result, an optical clock signal can be extracted even for an input optical signal of which bit rate is faster than the response speed of the SOA.

The bit rate, which an SOA used for implementing wavelength conversion itself can adapt, is generally 10 Gbit/s, at most 40 Gbit/s, and this is a value in a range of the rates controlled by the carrier life of the SOA. According to the optical clock signal extraction device of the first invention, the optical signal can be extracted even from an input optical pulse signal having a bit rate higher than the rate that can be controlled by the carrier life of the SOA, even if an SOA, of which fabrication method has already been established, is used.

If the input optical signal is directly input to the MLLD and the optical clock signal is extracted from a weak input optical signal using the multiple modulation effect based on the resonance of the MLLD, just like the conventional method (e.g. see T. Ono, T. Shimizu, Y. Yano, and H. Yokoyama, "Optical clock extraction from 10-Gbit/s data pulses by using monolithic mode-locked laser diodes," OFC '95 Technical Digest, ThL4, and S. Arahira, S. Sasaki, K. Tachibana, Y. Ogawa, "All-optical 160-Gb/s clock extraction with a mode-locked laser diode module," IEEE Photon. Technol. Lett. vol. 16, No. 6, pp. 1558-1560, June 2004.), the following problems occur. A problem occurs when the optical clock signal is extracted in a Wave Division Multiplexing (WDM) optical communication system. In a WDM system, it is prohibited to assign an arbitrary wavelength to each channel, because a wavelength to be assigned to each channel must correspond to the wavelength grid according to a unified standard.

In concrete terms, the wavelength $\lambda_3$ of the optical clock signal to be output from the MLLD must match this wavelength grid. If the wavelength $\lambda_1$ of the input optical signal and the wavelength $\lambda_3$ of the optical clock signal are the same, the condition of the wavelength $\lambda_3$ matching the wavelength grid is satisfied. But if $\lambda_1 \neq \lambda_3$, the wavelength $\lambda_3$ does not always match the wavelength grid.

In a WDM system, the interval of the wavelength grid and the bit rate frequency are set so as not to match, in order to prevent interference among the optical signals between channels. For example, the bit rate is 39.81312 GHz and the interval of the wavelength grid is 50 GHz. In other words, a simple relationship where the interval of the wavelength grid is an integral multiple of the bit rate frequency is not established. Therefore in the case when the optical clock signal is extracted according to the conventional method and $\lambda_1 \neq \lambda_3$, the oscillation wavelength $\lambda_3$, unique to MLLD, cannot match the wavelength grid if using the multiple modulation effect by the resonance of the MLLD is attempted, since a WDM optical communication system is set so as to match the $\lambda_2$ wavelength grid. This is because the ratio of $\lambda_1$ and $\lambda_3$ must be an integral ratio, as mentioned above.

On the other hand, according to the optical clock signal extraction device of the first invention, which has the first conversion means, the wavelength $\lambda_2$ of the intermediate optical signal can be set to be an integral ratio with $\lambda_1$ by this the first conversion means, so even if $\lambda_1 \neq \lambda_3$, the wavelength $\lambda_3$ of the optical clock signal to be extracted can be matched with the wavelength grid. In other words, the optical clock signal extraction device of the first invention can be a device suitable for a WDM optical communication system.

<First Optical Converter>The optical clock signal extraction device of the first invention can also be implemented using a saturable observer or EAM, instead of SOA, for the first optical converter which is a composing element thereof. For the saturable absorber or EAM, the saturable absorption area of MLLD, which was described with reference to FIG. 3, for example, can be used. Here it is preferable to form the optical guide, which functions as the saturable absorber or EAM using bulk crystals or a strained-layer quantum-well, so that the later mentioned cross-absorption modulation (XAM) effect can be manifested without depending on the polarization direction of the input optical signal.

In the optical pulse signal extraction device shown in FIG. 1 and FIG. 2, the intermediate optical signal (wavelength $\lambda_2$) is generated using XGM manifested in SOA which is the first optical converter. In other words, the intermediate optical signal is generated based on the continuous wave light of which wavelength is $\lambda_2$ using the phenomena that the positive gain in SOA is modulated by the input optical signal.

Whereas in the case of implementing the first optical converter using the saturable absorber or EAM, the intermediate optical signal (wavelength $\lambda_2$) is generated using XAM. In this case, the intermediate optical signal is generated from the continuous wave light of which wavelength is $\lambda_2$, by using the phenomena that the negative gain, that is the optical absorption coefficient, of the saturable absorber or EAM is modulated by the input optical signal. In the case of generating the intermediate optical signal using XAM, however, the RZ signal pattern which is an input optical signal and the intermediate optical signal pattern to be generated do not have a logically inverted relationship but a same logic relationship. But as described above, it does not matter for the purpose of extracting the optical clock signal whether the RZ signal pattern which is an input optical signal and the intermediate optical signal pattern to be generated have a logically inverted relationship or a same logic relationship, as described above.

An advantage of implementing the first optical converter using a saturable absorber or EAM, instead of SOA, is that an optical clock signal can be extracted from the input optical signal at higher speed, compared with the case of implementing the first optical converter using SOA.

As described above, the optical clock signal can be extracted from the input optical signal of which bit rate is faster than the response speed of SOA, even if the first optical converter is implemented using SOA, but there is a limitation. If the response speed of SOA is much slower than the bit rate frequency of the input optical signal, the degree of the carrier modulation of SOA becomes very small, and the intermediate optical signal, which is output from SOA, has a waveform in the time domain similar to continuous wave light. Even if such an intermediate optical signal having a waveform in the time domain similar to continuous wave light is input to the MLLD, the passive mode-locking operation cannot be manifested. In other words, in MLLD, the optical pulse generation step (second conversion step), which is the optical clock signal extraction operation, cannot be implemented. In order to implement the optical clock signal extraction operation in the MLLD at high-speed, a much faster element is required for the first optical converter.

If a saturable absorber or EAM is used for the first optical converter, instead of SOA, the operation speed thereof can be further increased. The reasons why this increase in speed is possible is because the operation speed of the saturable absorber or EAM is determined by the speed of the carriers, generated by the input of the optical pulses constituting the input optical signal, being extracted by the reverse bias voltage applied to the saturable absorber or EAM. In other words, the speed of the carrier being extracted is much faster than the life of the carrier based on the inter-band transition, and is several ps to several tens ps at the slowest. This speed is sufficiently faster compared with the carrier life based on the inter-band transition in the SOA, which is several hundred ps (pico seconds) to several ns (nano seconds). As a result, by using a saturable absorber or EAM for the first optical converter, instead of SOA, an optical clock signal can be extracted from an input optical signal of which bit rate is much faster.

Third Embodiment

Figure 10:
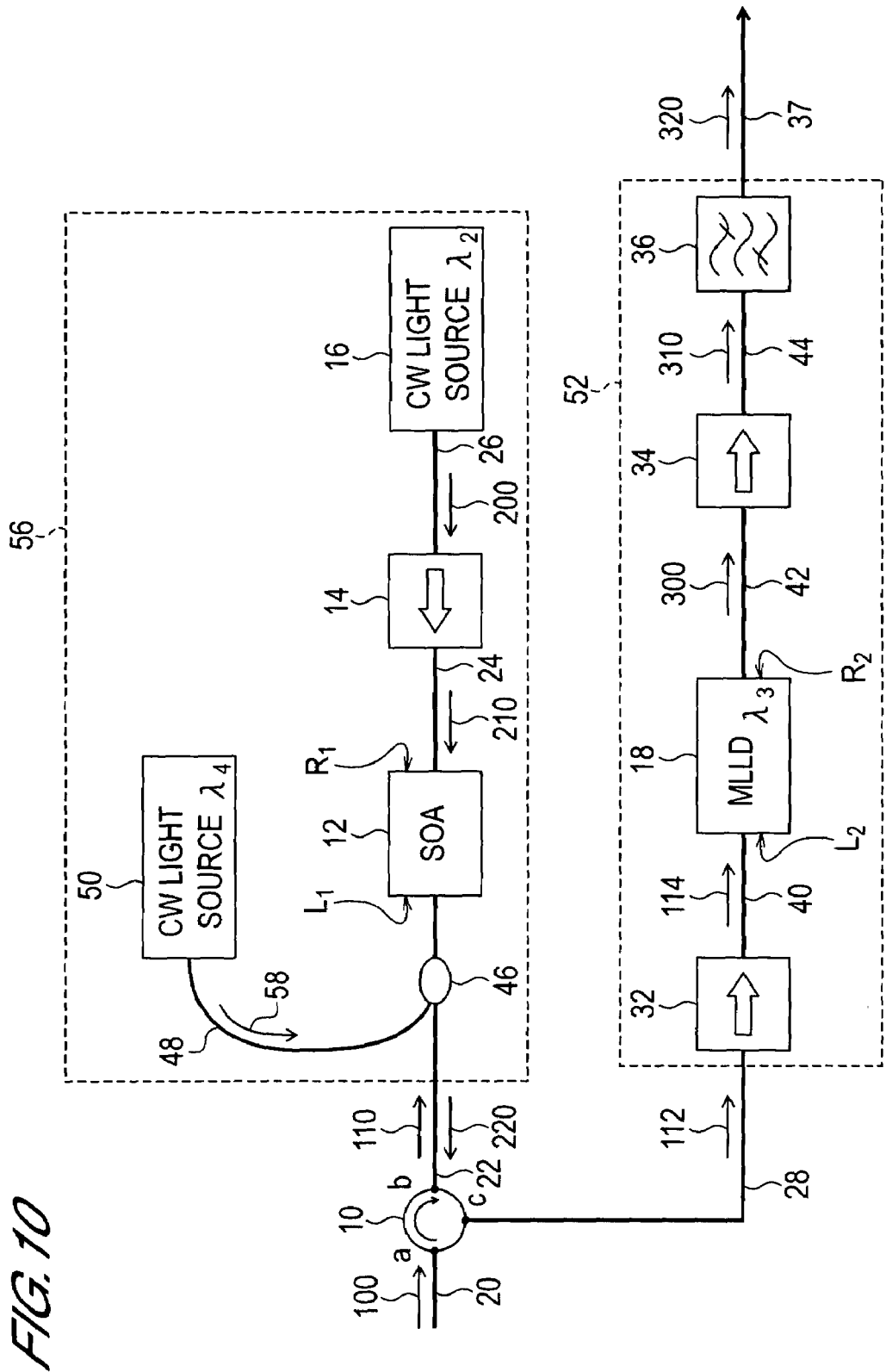
FIG. 10 is a block diagram depicting an overview of the optical clock signal extraction device according to the third embodiment.

The optical clock signal extraction device and the optical clock signal extraction method of the second invention will now be described with reference to FIG. 10 as the third embodiment. FIG. 10 is a block diagram depicting this optical clock signal extraction device.

The difference between the optical clock signal extraction device of the second invention and the above described optical clock signal extraction device of the first invention is the first conversion means. For the first optical converter of the first conversion means, SOA can be used, but unlike the case of the optical clock signal extraction device of the first invention, a saturable absorber or EAM cannot be used. In other words, in the optical clock signal extraction method of the second invention, the first conversion step is implemented not by XAM but by XGM.

If the first conversion step is implemented using XGM, the speed drops compared with the case of implementing using XAM. However, as mentioned later, the response speed of SOA can be increased by inputting not only the continuous wave light of which wavelength is $\lambda_2$, but also the continuous wave light of which wavelength is $\lambda_4$ as well into the SOA, which is the first optical converter.

The first conversion means 56 of the optical clock signal extraction device of the second invention has the continuous wave light source 50 of which wavelength is $\lambda_4$, in addition to the first optical converter 12 (SOA in this case), and the continuous wave light source 16 of which wavelength is $\lambda_2$. The input optical signal 100 of which bit rate is f and wavelength is $\lambda_1$, continuous wave light 200 of which wavelength is $\lambda_2$, and continuous wave light 58 of which wavelength is $\lambda_4$ are input to the first optical converter 12, and by the cross-gain modulation effect which is manifested by the input optical signal 110, continuous wave light 210 of which wavelength is $\lambda_2$ and continuous wave light 58 of which wavelength is $\lambda_4$, the intermediate optical signal 220 of which wavelength is $\lambda_2$ is generated and output without depending on the polarization direction of the input optical signal 110. In the case of the optical clock signal extraction device of the second invention shown in FIG. 10, the continuous wave light 58 of which wavelength is $\lambda_4$, which is output from the continuous wave light source 50, propagates through the optical path 48, and is input to the first optical converter 12 via the optical coupler 46.

Description on the optical circulator 10 and the optical isolator 14, which are the same as those used for the first invention, will be omitted. Description on the second conversion means 52, which is also the same as the one used in the first invention, will also be omitted.

In the optical clock signal extraction device of the second invention as well, the operation is based on the operation principle where the optical clock signal is extracted via the first conversion step and the second conversion step, just like the case of the optical clock signal extraction device of the first invention. The difference is that in the first conversion step, not one but two types of continuous wave light, the continuous wave light of which wavelength is $\lambda_2$ and the continuous wave light of which wavelength is $\lambda_4$, is input to the first optical converter 12. By this, compared with the case of inputting one type of continuous wave light to the first optical converter 12, induced emission in SOA, constituting the first optical converter 12, can be enhanced, and the carrier recovery speed can be increased. As a result, the response speed of SOA can be increased, as mentioned above.

The fact that induced emission in SOA can be enhanced by using not only one but two types of continuous light, continuous wave light of which wavelength is $\lambda_2$ and continuous wave light of which wavelength is $\lambda_4$, is disclosed in the following document: (R. J. Manning, D. A. O. Davis, D. Cotter and J. K. Lucek: "Enhanced recovery rates in semiconductor laser amplifiers using optical pumping", Electron. Lett. Vol. 30, No. 10, pp. 787-788, May 1994).

In this way, the operation of the first conversion step is increased by constructing the first conversion means using SOA, and inputting two types of continuous wave light which have different wavelengths to SOA, so an optical clock signal can be extracted even from a fast input optical signal. The optical clock signal extraction device in the second invention can make the optical clock signal extraction operation faster, as the optical clock signal extraction device of the first invention was implemented using a saturable absorber or EAM as the first optical converter. In this aspect, both inventions have the same advantage.

However, while the effect of induced emission is used for the optical clock signal extraction device of the second invention, the optical absorption effect is used for the optical clock signal extraction device of the first invention if a saturable absorber or EAM is used. As a result, in the optical clock signal extraction device of the second invention where the effect of induced emission is used, it is easy to generate the intermediate optical signal, which is generated by the first conversion means, with sufficient intensity. On the other hand, in the optical clock signal extraction device of the second invention, one more continuous wave light source must be provided. Therefore it is a matter of concern in system design to integrate the optical clock signal extraction function whether the first or second optical clock signal extraction device is used.

In the above description, it was assumed that the polarization mode of the oscillation light of the MLLD is TE polarization, but the first and second optical clock signal extraction methods can be implemented in the same manner, even if the polarization mode of the oscillation light of the MLLD is TM polarization, by setting the polarization mode of the intermediate optical signal to TM polarization. To set the polarization mode of the intermediate optical signal to TM polarization, the optical path 28 is formed by the polarization plane preserving optical fiber, and is installed such that the wave guiding mode thereof becomes TM polarization when the wave guiding mode is input to the MLLD. It is easy for an expert in the art to install the polarization plane preserving optical fiber.

What is claimed is:

1. An optical clock signal extraction device comprising:
    first conversion means, comprising a first optical converter and a continuous wave light source of which wavelength is $\lambda_2$, for inputting an input optical signal of which bit rate is f and wavelength is $\lambda_1$ and continuous wave light of which wavelength is $\lambda_2$ into said first optical converter, and generating and outputting an intermediate optical signal which has wavelength $\lambda_2$ and which does not depend on the polarization direction of the input optical signal; and
    second conversion means, comprising a second optical converter, for inputting said intermediate optical signal into said second optical converter and generating and outputting an optical clock signal of which repeat frequency is f and wavelength is $\lambda_3$ by passive mode locking operation of said second optical converter.

2. The optical clock signal extraction device according to claim 1, wherein said first optical converter is a semiconductor optical amplifier of which active layer is formed by bulk crystals and of which amplification factor does not depend on the polarization direction of said input optical signal.

3. The optical clock signal extraction device according to claim 2, wherein said second optical converter is a passive mode-locked laser diode having a gain area and a saturable absorption area.

4. The optical clock signal extraction device according to claim 1, wherein said first optical converter is a semiconductor optical amplifier of which active layer is formed by a strained-layer quantum-well structure and of which amplification factor does not depend on the polarization direction of said input optical signal.

5. The optical clock signal extraction device according to claim 4, wherein said second optical converter is a passive mode-locked laser diode having a gain area and a saturable absorption area.

6. The optical clock signal extraction device according to claim 1, wherein said first optical converter is a saturable absorber of which active layer is formed by a strained-layer quantum-well structure, and of which amplification factor does not depend on the polarization direction of said input optical signal.

7. The optical clock signal extraction device according to claim 6, wherein said second optical converter is a passive mode-locked laser diode having a gain area and a saturable absorption area.

8. The optical clock signal extraction device according to claim 1, wherein said first optical converter is an electro-absorption modulator of which active layer is formed by a strained-layer quantum-well structure, and of which amplification factor does not depend on the polarization direction of said input optical signal.

9. The optical clock signal extraction device according to claim 8, wherein said second optical converter is a passive mode-locked laser diode having a gain area and a saturable absorption area.

10. The optical clock signal extraction device according to claim 1, wherein said second optical converter is a passive mode-locked laser diode having a gain area and a saturable absorption area.

11. An optical clock signal extraction device, comprising:
    first conversion means, comprising a first optical converter, a continuous wave light source of which wavelength is $\lambda_2$, and a continuous wave light source of which wavelength is $\lambda_4$, for inputting an input optical signal of which bit rate is f and wavelength is $\lambda_1$, continuous wave light of which wavelength is $\lambda_2$ and continuous wave light of which wavelength is $\lambda_4$ into said first optical converter and generating and outputting an intermediate optical signal which has wavelength $\lambda_2$ and which does not depend on the polarization direction of the input optical signal; and second conversion means, comprising a second optical converter, for inputting said intermediate optical signal into said second optical converter, and generating and outputting an optical clock signal of which repeat frequency is f and wavelength is $\lambda_3$ by passive mode locking operation of said second optical converter.

12. The optical clock signal extraction device according to claim 11, wherein said first optical converter is a semiconductor optical amplifier of which active layer is formed by bulk crystals and of which amplification factor does not depend on the polarization direction of the input optical signal.

13. The optical clock signal extraction device according to claim 12, wherein said second optical converter is a passive mode-locked laser diode having a gain area and a saturable absorption area.

14. The optical clock signal extraction device according to claim 11, wherein said first optical converter is a semiconductor optical amplifier of which active layer is formed by a strained-layer quantum-well structure and of which amplification factor does not depend on the polarization direction of said input optical signal.

15. The optical clock signal extraction device according to claim 14, wherein said second optical converter is a passive mode-locked laser diode having a gain area and a saturable absorption area.

16. The optical clock signal extraction device according to claim 11, wherein said second optical converter is a passive mode-locked laser diode having a gain area and a saturable absorption area.

17. An optical clock signal extraction method, comprising:
a first conversion step of inputting an input optical signal of which bit rate is f and wavelength is $\lambda_1$ and a continuous wave light of which wavelength is $\lambda_2$ into a first optical converter, and generating and outputting an intermediate optical signal of which wavelength is $\lambda_2$ by a cross gain modulation effect, which is manifested by said input optical signal and said continuous wave light, without depending on the polarization direction of the input optical signal; and second conversion step of inputting said intermediate optical signal into a second optical converter, and generating and outputting an optical clock signal of which repeat frequency is f and wavelength is $\lambda_3$ by passive mode locking operation of said second optical converter.

18. An optical clock signal extraction method, comprising:
a first conversion step of inputting an input optical signal of which bit rate is f and wavelength is $\lambda_1$, a continuous wave light of which wavelength is $\lambda_2$, and a continuous wave light of which wavelength is $\lambda_4$ into a first optical converter, and generating and outputting an intermediate optical signal of which wavelength is $\lambda_2$ without depending on the polarization direction of said input optical signal; and a second conversion step of inputting said intermediate optical signal to a second optical converter, and generating and outputting an optical clock signal of which repeat frequency is f and wavelength is $\lambda_3$ by passive mode locking operation of said second optical converter.

19. The optical clock signal extraction method according to claim 17, wherein said second conversion step is executed by passive mode-locked laser diode having a gain area and saturable absorption area which sets one of longitudinal oscillation modes of said passive mode-locked laser diode to a value close to $\lambda_2$ which is a wavelength of said intermediate optical signals.

20. The optical clock signal extraction method according to claim 18, wherein said second conversion step is executed by passive mode-locked laser diode having a gain area and saturable absorption area which sets one of longitudinal oscillation modes of said passive mode-locked laser diode to a value close to $\lambda_2$ which is a wavelength of said intermediate optical signals.

* * * * *